US012253195B2

(12) United States Patent
Bowman et al.

(10) Patent No.: US 12,253,195 B2
(45) Date of Patent: Mar. 18, 2025

(54) COUPLING HAVING VISUAL INSTALLATION INDICATORS

(71) Applicant: Victaulic Company, Easton, PA (US)

(72) Inventors: Matthew A. Bowman, Palmer, PA (US); Thomas Nunnally, Telford, PA (US); Michael S Fleck, Easton, PA (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

(21) Appl. No.: 17/736,124

(22) Filed: May 4, 2022

(65) Prior Publication Data

US 2022/0260188 A1 Aug. 18, 2022

Related U.S. Application Data

(63) Continuation-in-part of application No. 17/510,865, filed on Oct. 26, 2021, now Pat. No. 11,624,461.

(60) Provisional application No. 63/110,433, filed on Nov. 6, 2020.

(51) Int. Cl.
*F16L 23/08* (2006.01)
*F16L 17/04* (2006.01)
*F16L 21/06* (2006.01)
*F16L 23/04* (2006.01)

(52) U.S. Cl.
CPC .............. *F16L 23/08* (2013.01); *F16L 17/04* (2013.01); *F16L 21/065* (2013.01); *F16L 23/04* (2013.01); *F16L 2201/10* (2013.01)

(58) Field of Classification Search
CPC ......... F16L 23/036; F16L 23/04; F16L 23/08; F16L 21/06; F16L 21/065; F16L 17/04; F16L 2201/10

USPC .......................... 285/411, 337, 373, 419, 420
See application file for complete search history.

(56) References Cited

U.S. PATENT DOCUMENTS

| | | | |
|---|---|---|---|
| 2,752,173 A | 6/1956 | Krooss | |
| 4,639,020 A | 1/1987 | Rung et al. | |
| 5,018,704 A | 5/1991 | McLennan | |
| 5,018,768 A * | 5/1991 | Palatchy | F16L 17/04 285/420 |
| 5,758,907 A | 6/1998 | Dole et al. | |
| 6,533,333 B1 * | 3/2003 | Radzik | F16L 23/04 285/411 |
| 8,267,432 B2 | 9/2012 | Madara et al. | |
| 2003/0178850 A1 | 9/2003 | Dole et al. | |

(Continued)

FOREIGN PATENT DOCUMENTS

| | | | |
|---|---|---|---|
| DE | 202016000436 | 3/2016 | |
| TW | 201009229 A | 3/2010 | |
| WO | WO-2020230029 A1 * | 11/2020 | .............. F16L 23/08 |

OTHER PUBLICATIONS

Shouldered Pipe Jointing System; http://www.victaulic.co.uk; Shouldered May 1996—012A; 12 pages.

(Continued)

*Primary Examiner* — William S. Choi
(74) *Attorney, Agent, or Firm* — Ballard Spahr LLP

(57) ABSTRACT

A pipe coupling has two segments with action surfaces in facing relationship. Attachment elements on each segment, in the form of lugs, accommodate adjustable fasteners which draw the segments together when tightened. Support surfaces on the lugs engage one another to visually indicate that a proper installation of the coupling has been achieved.

25 Claims, 23 Drawing Sheets

(56) References Cited

U.S. PATENT DOCUMENTS

| | | | |
|---|---|---|---|
| 2005/0212296 A1* | 9/2005 | Dole | F16L 23/08 |
| | | | 285/420 |
| 2005/0253381 A1* | 11/2005 | Gibb | F16L 21/065 |
| 2008/0169648 A1 | 7/2008 | Kwon et al. | |
| 2011/0221189 A1* | 9/2011 | Dole | F16L 17/04 |
| | | | 285/337 |
| 2012/0256415 A1 | 10/2012 | Dole | |
| 2012/0256418 A1* | 10/2012 | Horgan | F16L 17/04 |
| | | | 285/420 |
| 2013/0125373 A1 | 5/2013 | Bancroft | |
| 2014/0327238 A1* | 11/2014 | Bowman | F16L 21/08 |
| 2017/0328500 A1* | 11/2017 | Bowman | F16L 23/08 |
| 2017/0328501 A1* | 11/2017 | Motoyama | F16L 23/08 |
| 2020/0332934 A1* | 10/2020 | Duncan | F16L 23/08 |

OTHER PUBLICATIONS

Victaulic QuickVic Rigid Coupling Style 107V; Victaulic.com; 06.33; 17189 Rev B; Updated Nov. 2021; 6 pages.

Installation Instructions; Style 107V QuickVic Installation-Ready Rigid Coupling; Victaulic.com; I-107V; 17027 Rev A; Updated Dec. 2021; 8 pages.

\* cited by examiner

COUPLING HAVING VISUAL INSTALLATION INDICATORS

CROSS REFERENCE TO RELATED APPLICATIONS

This application is a Continuation-in-Part of U.S. application Ser. No. 17/510,865, filed Oct. 26, 2021, which application is based upon and claims benefit of priority to U.S. Provisional Application No. 63/110,433, filed Nov. 6, 2020, both applications being hereby incorporated by reference herein.

FIELD OF THE INVENTION

This invention relates to mechanical couplings for joining pipe elements.

BACKGROUND

Prior art segmented mechanical couplings which rely on contact between the coupling and the pipe elements which they join in order to create a sufficiently stiff, or rigid joint may present challenges during installation, for example, in ease of assembly and the lack of consistent and identical visual indication that a coupling is properly installed in all intended conditions and over all pipe element tolerance ranges. Because such couplings rely on contact between the between the coupling and the pipe elements, they are affected by the wide tolerance ranges of the pipe surface as well as the tolerance range on the interfacing surface of the coupling. In couplings which rely on forceful radial contact between the pipe elements and the interfacing surfaces on the couplings, this dependency often results in varying gaps between the connection members which are used to hold the segments one to another around the pipe. While these gaps may not affect coupling performance, they complicate assembly by preventing the use of contact between the interfacing surfaces of the connection members as a reliable visual indicator of complete and proper assembly. Other forms of segmented couplings, especially those used on grooved pipe elements, have addressed this challenge in the art by having the engagement of the connection members occur along an inclined plane, such that rotation of the segments is induced, causing the segments to rotate relatively to one another such that the "keys" of the coupling lock into the circumferential grooves of the pipe elements and form a sufficiently stiff, or rigid joint in bending and torsion between them. U.S. Pat. No. 4,639,020 to Rung et al., hereby incorporated by reference herein, discloses an example of such a coupling. However, the more complicated interface between the coupling segments creates additional cost and adds complexity due to the rotation of the coupling segments relative one to another. There is clearly an opportunity to improve segmented mechanical couplings so they are easier to assemble and provide consistent and unambiguous visual indication confirming proper installation.

SUMMARY

The invention concerns a coupling for joining pipe elements in end to end relation. In an example embodiment, a coupling according to the invention comprises first and second segments attached to one another end to end surrounding a central space for receiving the pipe elements. Each segment comprises a first lug extending from a first end thereof and a second lug extending from a second end thereof. The first and second lugs of the first segment align respectively with the first and second lugs of the second segment. A first adjustable fastener extends between the first lugs and a second adjustable fastener extends between the second lugs. In an example embodiment each segment further comprises a first action surface positioned between the central space and the first lug, and a first support surface positioned on the first lug. The first fastener is positioned between the first action surface and the first support surface, the first action surface and the first support surface are oriented transversely to a longitudinal axis of the first fastener. A second action surface is positioned between the central space and the second lug, and a second support surface is positioned on the second lug. The second fastener is positioned between the second action surface and the second support surface, the second action surface and the second support surface are oriented transversely to a longitudinal axis of the second fastener.

In an example embodiment, the first lugs may be adapted, upon tightening of the first adjustable fastener, to assume either a first configuration, wherein the first action surfaces are in contact with one another and the first support surfaces are in contact with one another, or a second configuration, wherein the first support surfaces are in contact with one another, there being a gap between the first action surfaces. Further by way of example, the second lugs may be adapted, upon tightening of the second adjustable fastener, to assume either a first configuration, wherein the second action surfaces are in contact with one another and the second support surfaces are in contact with one another, or a second configuration, wherein the second support surfaces are in contact with one another, there being a gap between the second action surfaces.

In an example embodiment the first lugs define a first opening surrounding a first axis oriented transversely to the longitudinal axis of the first fastener and positioned between the first action surfaces and the first support surfaces. In a particular example the first opening extends through the first lugs. In further example the second lugs define a second opening surrounding a second axis oriented transversely to the longitudinal axis of the second fastener and positioned between the second action surfaces and the second support surfaces. The second opening may extend through the second lugs by way of example.

In an example embodiment each one of the first and second adjustable fasteners comprises a nut and bolt. In a further example, each of the segments comprises first and second arcuate projections positioned on opposite sides of the segments. Each of the arcuate projections faces the central space, and each of the arcuate projections is engageable within circumferential grooves in the pipe elements when the segments are drawn toward one another by the adjustable fasteners. By way of example a seal may be positioned within the central space. The seal supports the segments in spaced apart relation sufficient to permit insertion of the pipe elements into the central space without disassembling the coupling.

The invention further encompasses a coupling for joining pipe elements in end to end relation wherein the coupling comprises first and second segments attached to one another end to end surrounding a central space for receiving the pipe elements. Each segment comprises a first lug extending from a first end thereof. The first lug of the first segment aligns with the first lug of the second segment. A first adjustable fastener extends between the first lugs. In this example embodiment each segment further comprises a second end. The second ends of the segments are arranged opposite to the first ends respectively, and each second end is connected to a hinge joining the first and second segments to one another. The hinge defines a hinge axis oriented transversely to a longitudinal axis of the first fastener. The first and second segments are pivotable about the hinge axis. In this example each segment further comprises a first action surface positioned between the central space and the first lug, and a first support surface positioned on the first lug. The first fastener is positioned between the first action surface and the first support surface. The first action surface and the first support surface are oriented transversely to the longitudinal axis of the first fastener.

In an example embodiment the first lugs may be adapted, upon tightening of the first adjustable fastener, to assume either a first configuration, wherein the first action surfaces are in contact with one another and the first support surfaces are in contact with one another, or a second configuration, wherein the first support surfaces are in contact with one another, there being a gap between the first action surfaces. Further by way of example, the first lugs define a first opening surrounding a first axis oriented transversely to the longitudinal axis of the first fastener and positioned between the first action surfaces and the first support surfaces. In a specific example, the first opening extends through the first lugs. Further by way of example the first adjustable fastener comprises a nut and bolt.

In an example coupling according to the invention, each of the segments comprises first and second arcuate projections positioned on opposite sides of the segments. Each of the arcuate projections face the central space. Each of the arcuate projections is engageable within circumferential grooves in the pipe elements when the segments are drawn toward one another by the adjustable fastener. An example embodiment may further comprise a seal positioned within the central space. The seal supports the segments in spaced apart relation sufficient to permit insertion of the pipe elements into the central space without disassembling the coupling.

In a further example the first support surface of at least one of the segments may be offset from the first action surface of the at least one segment, the offset being measured from the first action surface. Also by way of example, the second support surface of the at least one segment may be offset from the second action surface of the at least one segment, the offset of the second support surface being measured from the second action surface. In another example the first support surface of at least one of the segments may be oriented at a first orientation angle measured with respect to a plane extending between the first and second segments. Also by way of example, the first action surface of the at least one segment may be oriented at a second orientation angle measured with respect to the plane. In an example embodiment, the first orientation angle may be equal to the second orientation angle.

In an example embodiment the first action surface and the first support surface of the first segment may be oriented at a first orientation angle measured with respect to a plane extending between the first and second segments. The first action surface and the first support surface of the second segment may oriented at a second orientation angle measured with respect to the plane. The second action surface and the second support surface of the first segment may be oriented at a third orientation angle measured with respect to the plane. The second action surface and the second support surface of the second segment may be oriented at a fourth orientation angle measured with respect to the plane in another example. Further by way of example, the support surface of at least one of the segments may be offset from the action surface of the at least one segment with the offset being measured from the action surface.

In another example embodiment the action surface and the support surface on the first segment may be oriented parallel to a first ray extending from a fulcrum of the hinge, and the action surface and the support surface on the second segment may be oriented parallel to a second ray extending from the fulcrum of the hinge. Further by way of example, the action surface on the first segment may be oriented parallel to a first ray extending from a fulcrum of the hinge, the support surface on the first segment may be oriented parallel to a second ray extending from the fulcrum of the hinge, the action surface on the second segment may be oriented parallel to a third ray extending from the fulcrum of the hinge and the support surface on the second segment may be oriented parallel to a fourth ray extending from the fulcrum of the hinge. In an example embodiment the second and the fourth rays may subtend a first angle larger than a second angle subtended by the first and third rays or a first angle smaller than a second angle subtended by the first and third rays.

DETAILED DESCRIPTION

Figure 1:
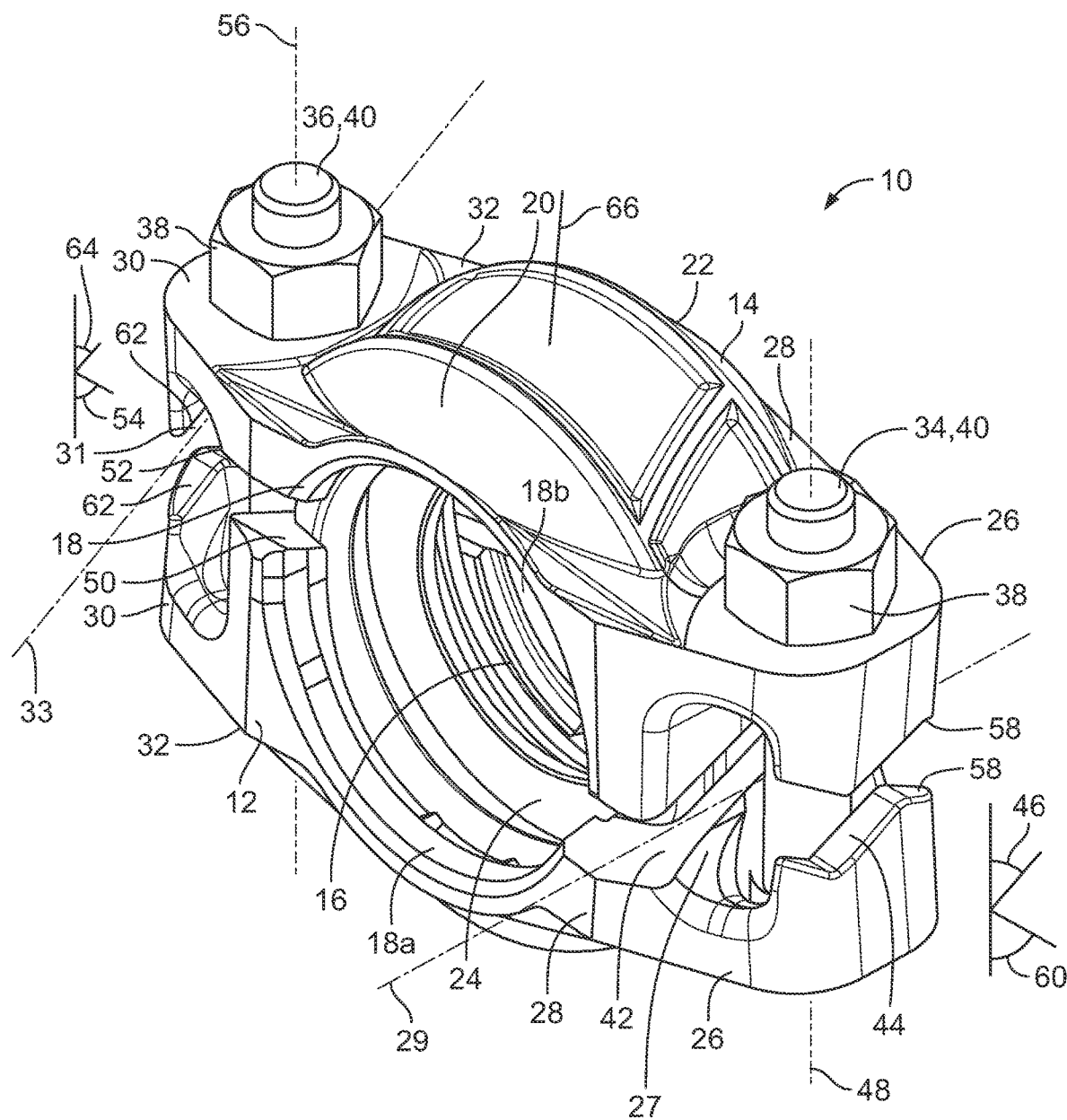
FIG. 1 is an isometric view of an example mechanical coupling according to the invention shown in a factory assembled state.

FIG. 1 shows an example coupling 10 according to the invention for joining pipe elements (not shown) in end to end relation. In this example the coupling 10 comprises a first segment 12 and a second segment 14. Segments 12 and 14 are attached to one another end to end to surround and define a central space 16 for receiving the pipe elements. Coupling 10 is designed to join pipe elements having circumferential grooves at an end and thus each of the segments 12 and 14 comprises first and second arcuate projections 18a and 18b (see also FIG. 2), also known as "keys", positioned on opposite sides 20 and 22 of the segments 12 and 14. The arcuate projections 18a and 18b face the central space 16 and are engageable within circumferential grooves in the pipe elements when the segments are drawn toward one another to form a joint. A seal 24 is positioned within the central space 16. Seal 24 is advantageously a ring gasket made of an elastomer such as EPDM, and may support the segments 12 and 14 in spaced apart relation as shown, at a distance sufficient to permit insertion of the pipe elements into the central space 16 without disassembling the coupling 10. Couplings according to the invention may also be used with plain end pipe, shouldered pipe or other formed pipe ends known in the art.

As further shown in FIG. 1, each segment 12, 14 comprises a first lug 26 extending from first ends 28 thereof. A second lug 30 extends from a second end 32 of each segment. The first and second lugs 26 and 30 of the first segment 12 align respectively with the first and second lugs 26 and 30 of the second segment 14. A first adjustable fastener 34 extends between the first lugs 26 of each segment 12 and 14, and a second adjustable fastener 36 extends between the second lugs 30 of each segment. In this example the first and second adjustable fasteners 34 and 36 comprise a nut 38 and bolt 40.

Figure 2:
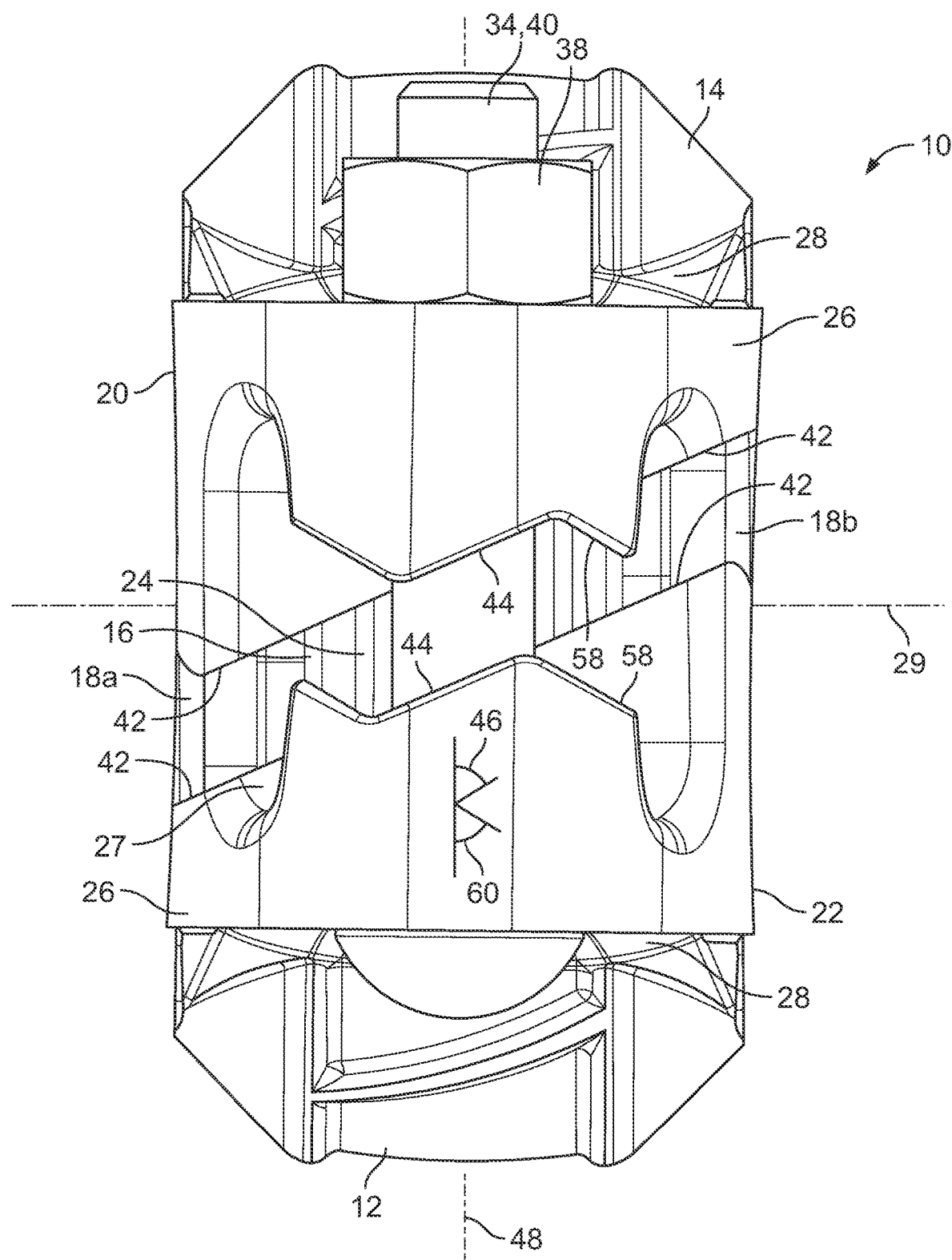
FIG. 2 is an end view of the coupling shown in FIG. 1.

Each segment 12 and 14 further comprises a first action surface 42 positioned between the central space 16 and the first lug 26. A first support surface 44 is positioned on the first lug 26 of each segment 12 and 14. The first fastener 34 is positioned between the first action surfaces 42 and the first support surfaces 44 of the segments 12 and 14. As shown in FIGS. 1 and 2, the first action surfaces 42 and the first support surfaces 44 are oriented at a first angle 46 transverse to a longitudinal axis 48 of the first fastener 34. The first angle 46 may have a slope ranging from 45° to 70°, with a slope of 60° considered advantageous. As shown in FIG. 1, a second action surface 50 is positioned between the central space 16 and the second lug 30 on each segment 12 and 14. A second support surface 52 is positioned on the second lugs 30 of each of the segments 12 and 14. The second fastener 36 is positioned between the second action surfaces 50 and the second support surfaces 52 of the segments 12 and 14. The second action surfaces 50 and the second support surfaces 52 are oriented at a second angle 54 transverse to a longitudinal axis 56 of the second fastener 36. The second angles 54 of the second action surfaces 50 and the second support surfaces 52 have an opposite slope from the first angle 46 of the first action surfaces 42 and the first support surfaces 44. It is advantageous if the slopes of the first and second angles 46 and 54 are also equal in magnitude as well as opposite in sign. Although, in the embodiments disclosed in this specification, the first and second action surfaces 42 and 50 have the same angular orientations as the first and second support surfaces 44 and 52 respectively, a practical design may also advantageously have action surfaces with orientation angles which differ from the orientation angles of their adjacent associated support surfaces.

At least a first stop surface 58 is positioned on the first lugs 26 of each segment 12 and 14 adjacent to the first support surfaces 44. The first stop surfaces 58 are oriented at a third angle 60 (see FIG. 1) having a slope opposite to the slope of the first angle 46. At least a second stop surface 62 is positioned on the second lugs 30 of each segment 12, 14 adjacent to the second support surfaces 52. The second stop surfaces 62 are oriented at a fourth angle 64 having a slope opposite to the second angle 54.

Advantageously, the first lugs 26 may define a first opening 27 surrounding a first axis 29 oriented transversely to the longitudinal axis 48 of the first fastener 34 and positioned between the first action surfaces 42 and the first support surfaces 44. In a practical embodiment, the first opening 27 extends through the first lugs 26. The bending stiffness of the first lugs 26 may be tuned to a desired value by properly sizing the first opening 27. Similarly, the second lugs 30 may define a second opening 31 surrounding a second axis 33 oriented transversely to the longitudinal axis 56 of the second fastener 36 and positioned between the second action surfaces 50 and the second support surfaces 52. In a practical embodiment, the second opening 31 extends through the second lugs 30. The bending stiffness of the second lugs 30 may be tuned to a desired value by properly sizing the second opening 31.

Figure 3:
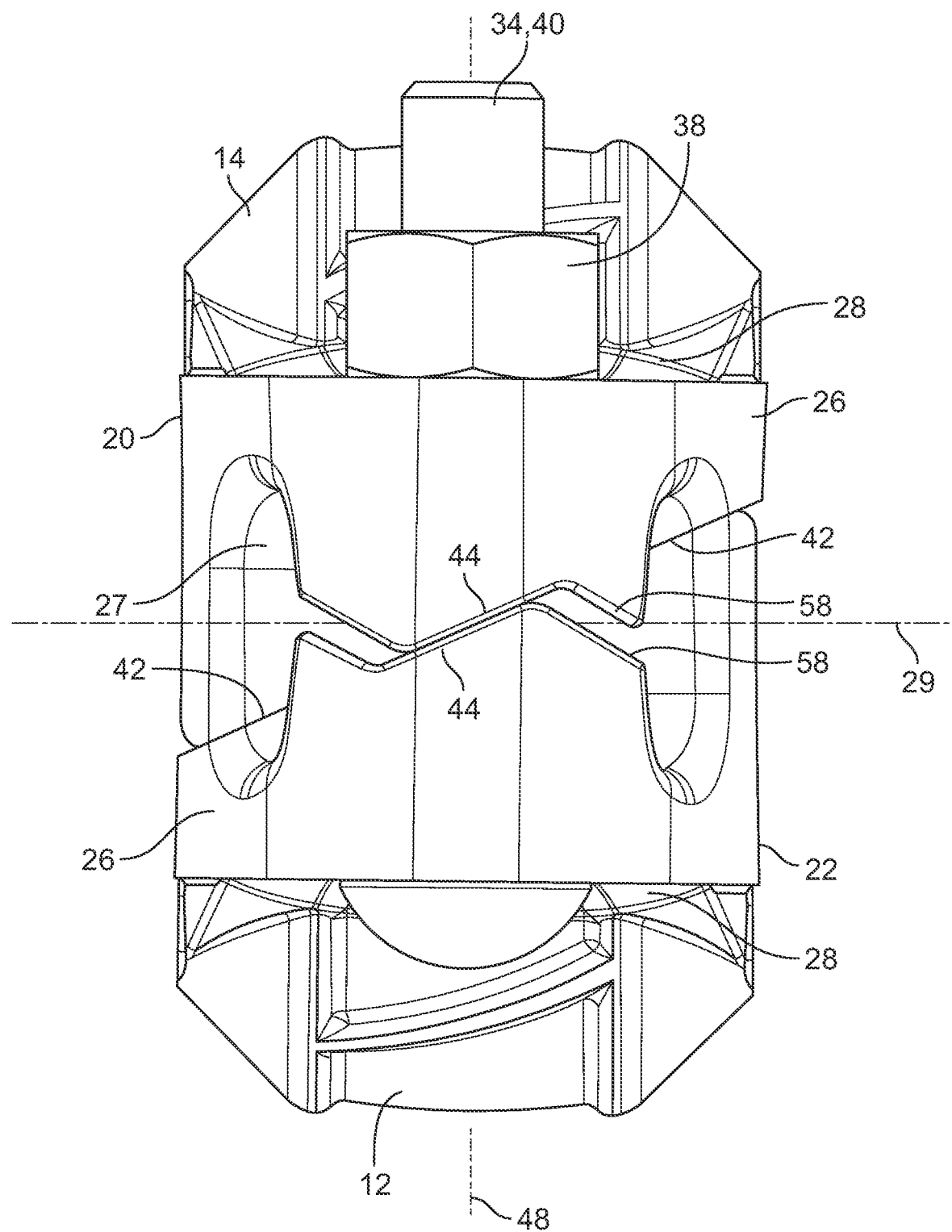
FIGS. 3 and 4 show end views of the example coupling during installation.

Operation of coupling 10 is described with reference to FIGS. 1-4. FIGS. 1 and 2 show the example coupling 10 in the factory assembled configuration with segments 12 and 14 supported in spaced apart relation on seal 24 at a distance from one another sufficient to permit pipe elements (not shown) to be inserted into the central space 16. In this factory assembled example fasteners 34 and 36 have been tightened sufficiently to hold the segments against the seal. The pipe elements are inserted into central space 16 and their circumferential grooves are aligned with the arcuate projections 18a and 18b on opposite sides 20 and 22 of the segments 12 and 14. Fasteners 34 and 36 are then further tightened to draw segments 12 and 14 toward one another. FIG. 3 shows the point when the first and second action surfaces 42 and 50 on segments 12 and 14 engage one another (42 shown). Advantageously, support surfaces 44 and 52 on each segment engage at approximately the same time (44 shown). Arcuate projections 18a and 18b (not visible in the figure) are also engaged within the grooves of the pipe elements at this point as well. During correct installation of coupling 10, engagement of the support surfaces 44 and 52 between the segments 12 and 14 provide a first visual indication confirming that correct installation is proceeding.

Figure 4:
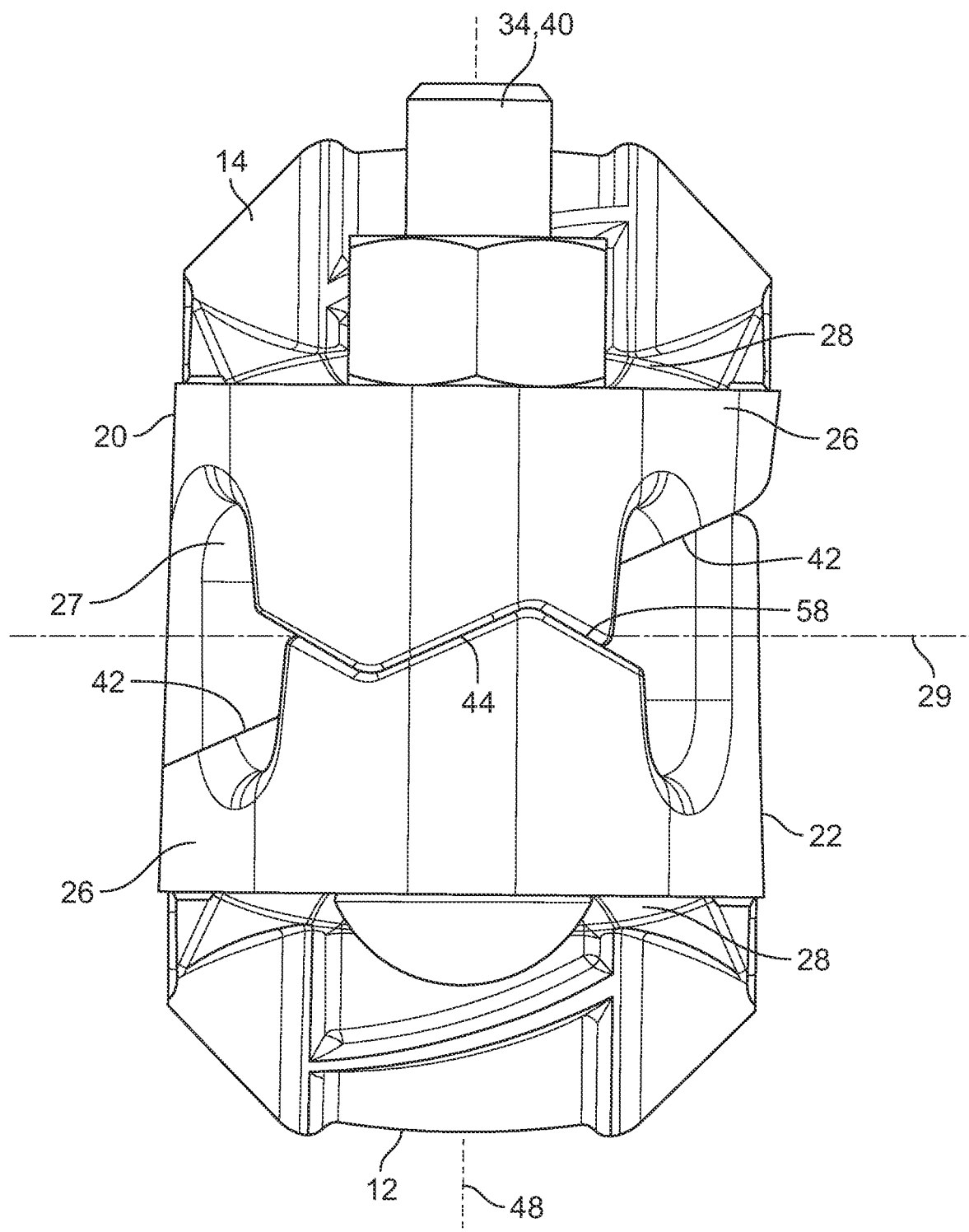
Figure 5:
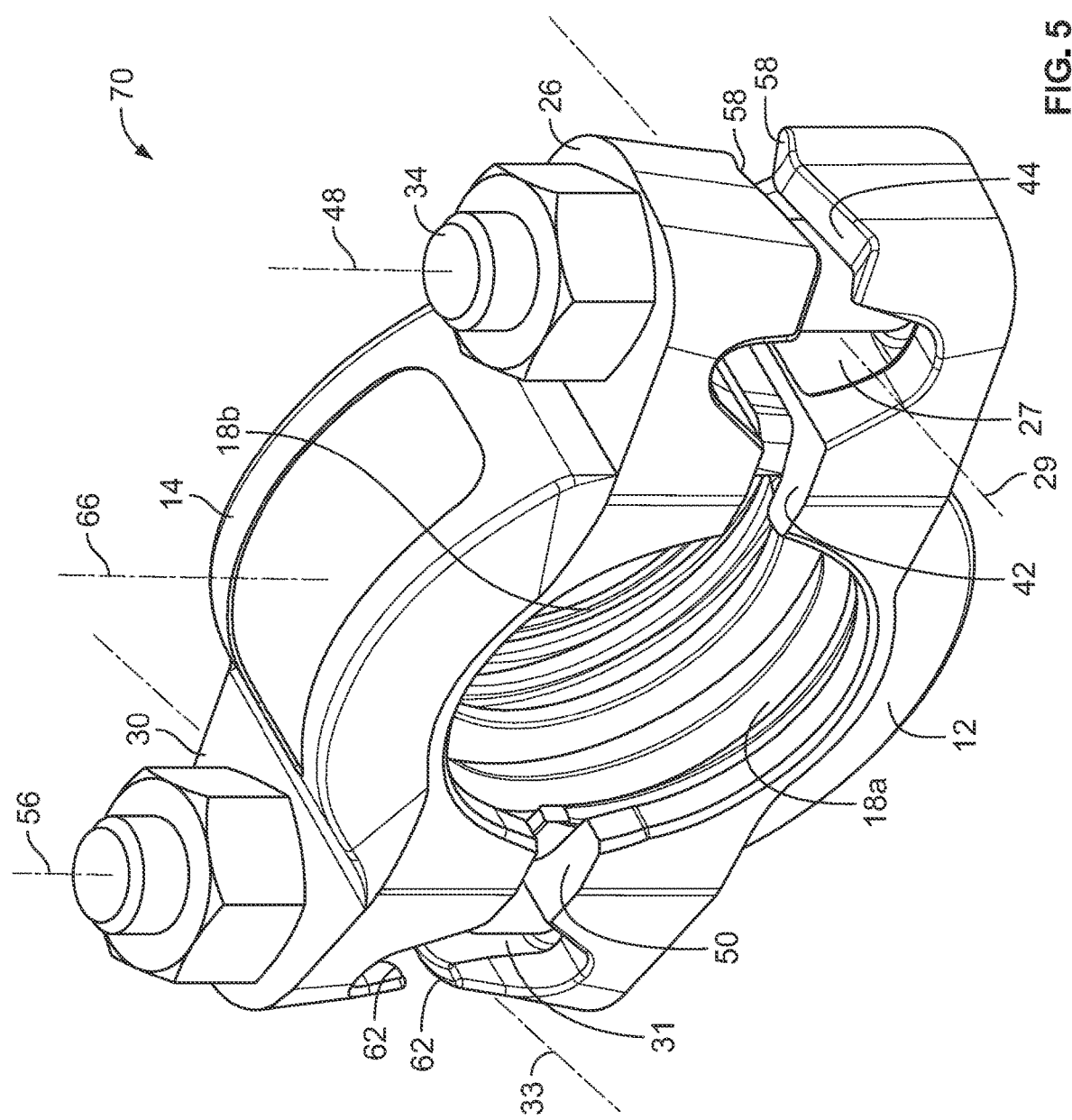
FIG. 5 is an isometric view of another example mechanical coupling according to the invention shown in a factory assembled state.
Figure 6:
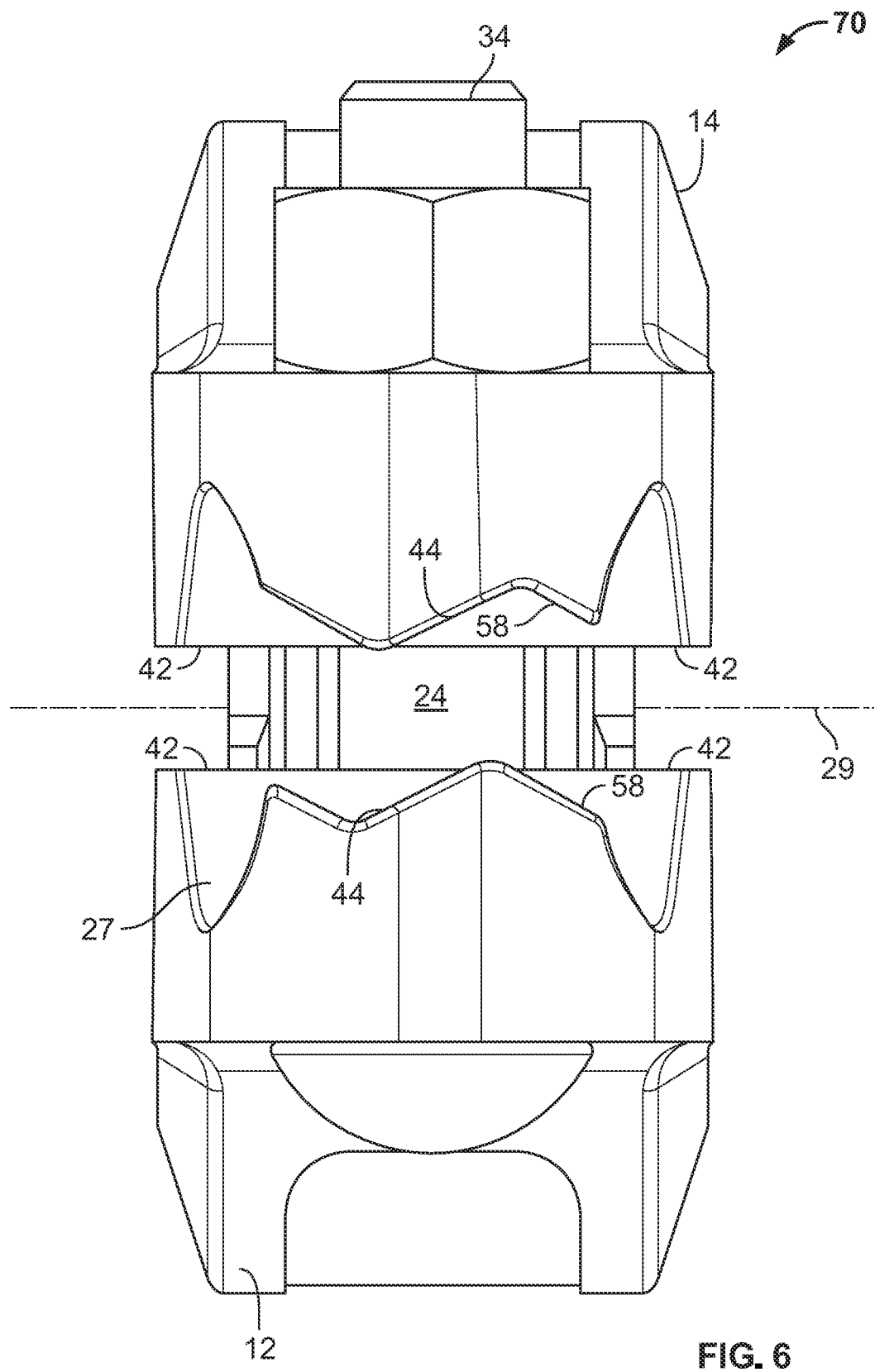
FIG. 6 is an end view of the coupling shown in FIG. 5.

The angular orientation and opposite slopes of the action surfaces 42 and 50 and the support surfaces 44 on the first end 28 of the segments and support surfaces 52 on the second end 30 cause the segments 12 and 14 to rotate in opposite directions relatively to one another as fasteners 34 and 36 are further tightened. FIG. 1 illustrates the axis of rotation 66 of the segments as the pair of action surfaces 42 and the pair of action surfaces 50 on each segment engage one another. The object of this rotation is to force the arcuate projections 18a and 18b to securely contact the sidewalls and/or the floors of the circumferential grooves of the pipe elements which they engage and thereby increase the rigidity of the joint in bending, axial loading, and torsion. Note, however, that the action surfaces 42 and 50 have no feature which limits the degree of relative rotation between the segments 12 and 14 as the fasteners are tightened. A feature which limits the relative rotation between the segments 12 and 14 is provided by the respective stop surfaces 58 and 62 on the lugs 26 and 30. As shown in FIG. 4, these stop surfaces (58 shown) engage as the fasteners are further tightened. The geometry of the action surfaces 42 and 50, the support surfaces 44 and 52, and the stop surfaces 58 and 62, their lengths, positions on the segments and orientation angles are coordinated with the arcuate projections 18*a* and 18*b* such that the projections lock up effectively within the circumferential grooves of the pipe elements when the first stop surfaces 58 and the second stop surfaces 62 respectively engage, or nearly engage as depicted in FIG. 4. Thus engagement of both stop surfaces 58 and 62 on opposite ends of the segments 12 and 14 provides visual confirmation that the coupling 10 has been properly installed. The stop surface 58 and 62 provide this confirmation over the entire tolerance range imposed on the circumferential grooves in the pipe elements. At one end of the groove tolerance range the segments 12 and 14 rotate about axis 66 to the limit imposed by respective engagement between the first stop surfaces 58 and the second stop surfaces 62. At the other end of the groove tolerance range engagement between one or both projections 18*a* and 18*b* and their respective circumferential grooves impose the limit on segment rotation. It is conceivable that when engagement between the projections 18*a* and 18*b* and the grooves limits segment relative rotation that one or both of the first and second stop surfaces 58 and 62 will not be engaged. However, the lugs 26 and 30 at opposite ends of the segments 12 and 14 are designed to deform when fasteners 34 and 36 are tightened once the rotational limit imposed by engagement between the projections 18*a* and 18*b* and their circumferential grooves is reached to permit the stop surfaces 58 and 62 to engage. The deformation is controlled in part by the size of the openings 27 and 29 which extend through the lugs 26 and 30. Thus, regardless of where the circumferential grooves in the pipe elements fall on the tolerance spectrum the technician needs merely to tighten the fasteners 34 and 36 until the stop surfaces 58 and 62 on respective lugs 26 and 30 at respective opposite ends 28 and 32 of segments 12 and 14 engage. This engagement provides a final visual confirmation that the coupling 10 has been properly installed.

In addition to being readily visually inspected to confirm a proper joint, couplings 10 according to the invention are also relatively insensitive to the installation procedure, affording greater ease of assembly. While a preferred installation practice is to partially tighten each fastener in a series of alternating steps, this practice may not always be followed. Instead, a technician may apply a powered impact wrench and fully tighten one fastener and then the other. However, with couplings 10 according to the invention this practice does not result in over-rotation of the coupling segments, which is prevented by engagement of the stop surfaces on the side of the one fastener which is first tightened. The technician may then apply torque to tighten the other fastener to bring the stop surfaces on the opposite end of the coupling into engagement to complete the installation. The geometry of the couplings is such that as long as both sets of stop surfaces 58 and 62 are in contact, the projections 18*a* and 18*b* will be securely engaged within their respective circumferential grooves, in contact with the groove sidewalls and/or floors to form a rigid joint.

Figure 7:
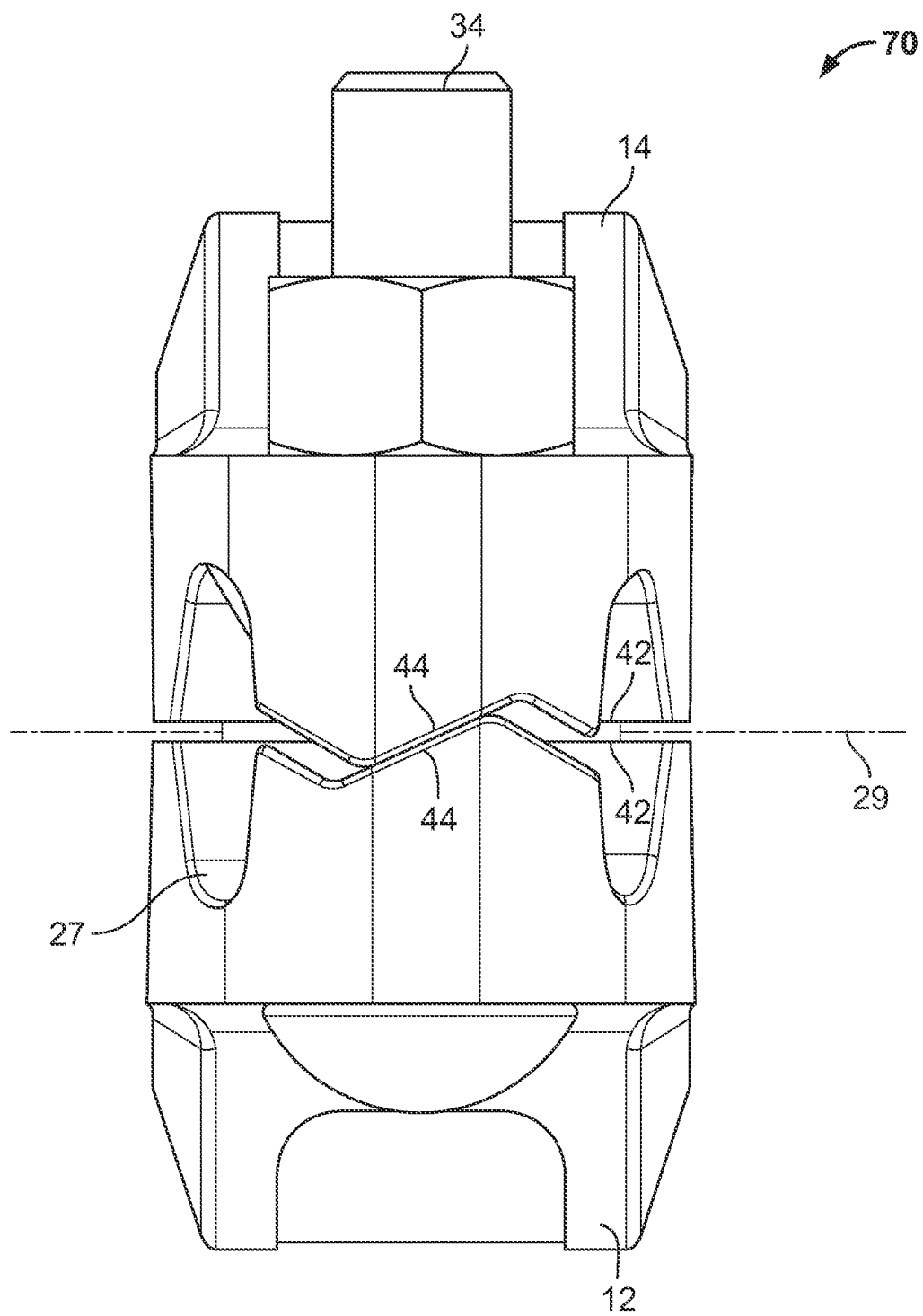
FIGS. 7 and 8 show end views of the example coupling during installation.
Figure 8:
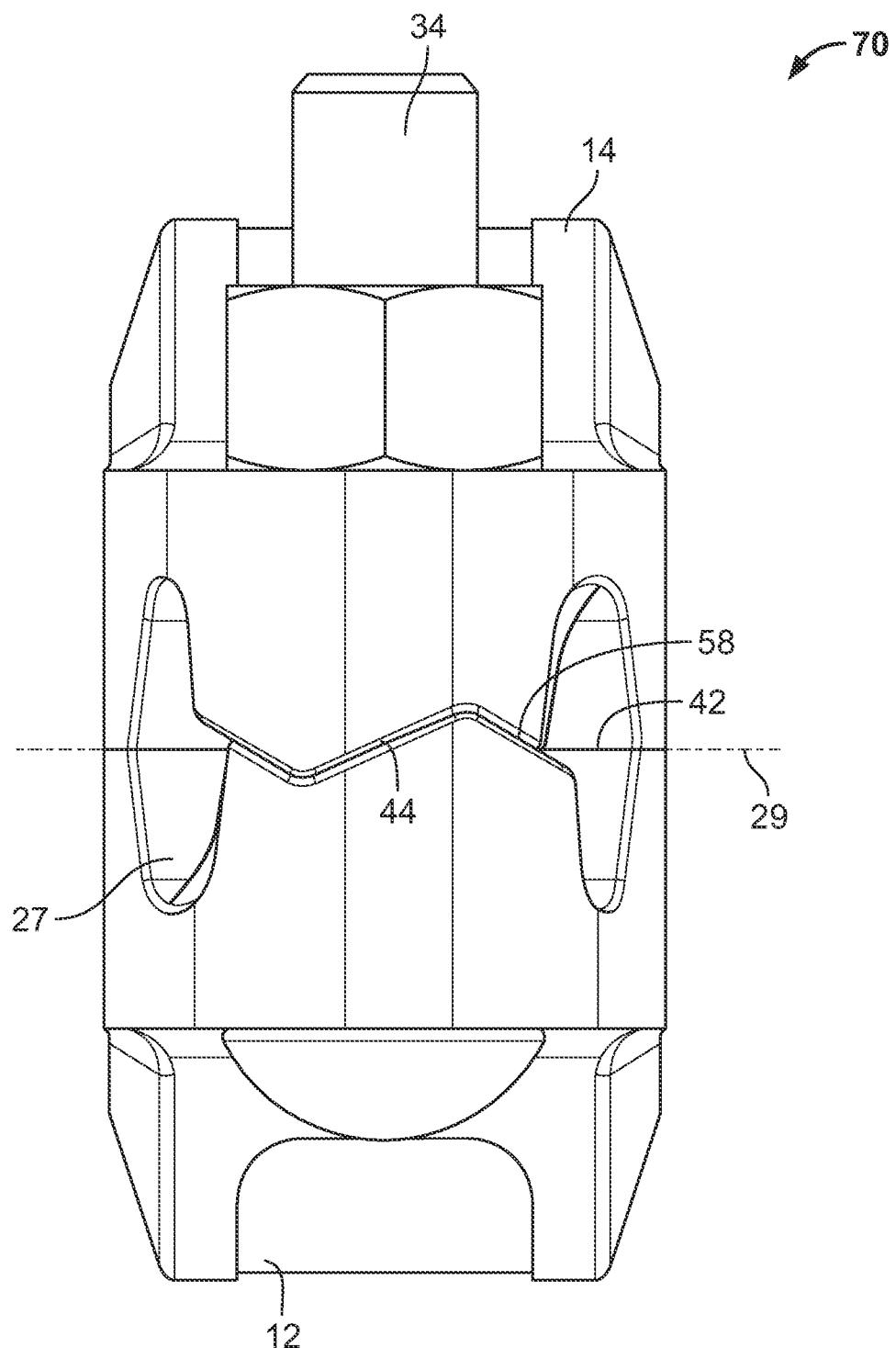

FIGS. 5-8 illustrate another example embodiment of a coupling 70 according to the invention. Coupling 70 is identical to coupling 10 as described above except for the orientation of the action surfaces 42 and 50. In coupling 70, the first action surface 42 is oriented substantially transversely to the longitudinal axis 48 of the first fastener 34 and the second action surface 50 is oriented substantially transversely to the longitudinal axis 56 of said second fastener 36. Due to the different orientation of the action surfaces 42 and 50 the coupling segments 12 and 14 do not rotate about axis 66 upon their engagement when the fasteners 34 and 36 are tightened to bring the segments toward one another to couple pipe elements to one another. Coupling 70 is advantageous when a more flexible pipe joint is desired. However, when the fasteners 34 and 36 are tightened, friction between the torqued fastener and its respective lug tends to rotate the coupling segments relatively to one another, thereby causing unwanted engagement between the projections 18*a* and 18*b* and the grooves in the pipe elements. As shown in FIGS. 7 and 8, this unwanted effect is mitigated by engagement between one or both of the stop surfaces 58 and 62 on the lugs 26 and 30 because the geometry of the support surfaces 44 and 52, and the stop surfaces 58 and 62, their lengths, positions on the segments and orientation angles are coordinated with the arcuate projections 18*a* and 18*b* such that the projections will not lock up within the circumferential grooves of the pipe elements when the first stop surfaces 58 and the second stop surfaces 62 respectively engage. Engagement between the stop surfaces and support surfaces may also serve as final visual confirmation that the coupling 70 has been properly installed.

Figure 9:
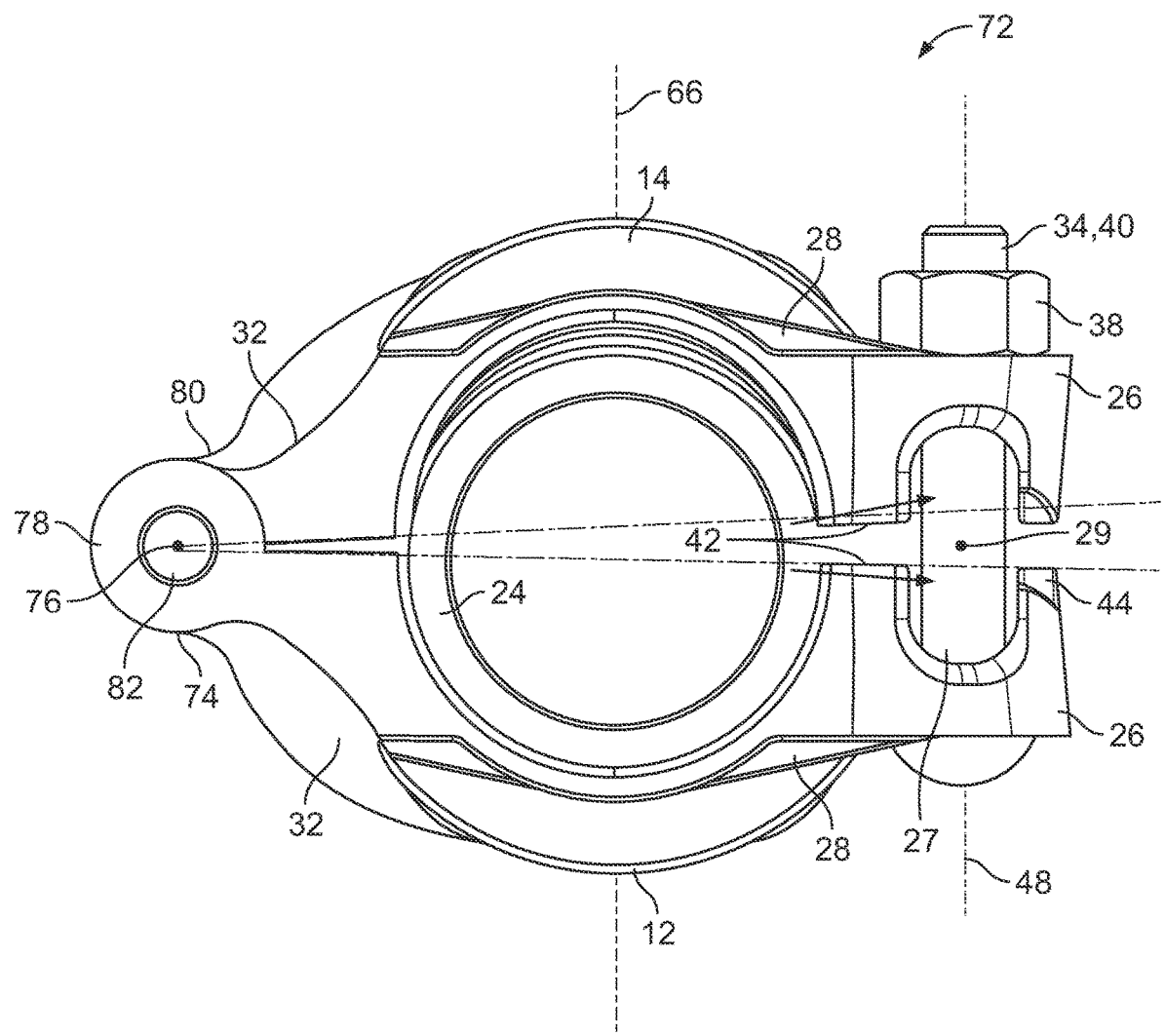
FIG. 9 is a front view of another example embodiment of a coupling according to the invention.

FIG. 9 illustrates another example embodiment of a coupling 72 according to the invention. Coupling 72 shares many of the features of coupling embodiments 10 and 70 as described above but substitutes a hinge in place of the second lugs 30. The second ends 32 of each segment 12 and 14, arranged opposite to the first ends 28, are connected to a hinge 74 joining the first and second segments to one another. The hinge 74 defines a hinge axis 76 oriented transversely to the longitudinal axis 48 of the first fastener 34. The first and second segments 12 and 14 are pivotable about the hinge axis 76. Adjusting the first fastener 34 pivots and thereby draws the first and second segments 12 and 14 toward one another, and engagement between the first stop surfaces 58 on the first lugs 26 (see FIG. 8) arrests rotation of the segments relatively to one another about the axis 66. In this example embodiment, hinge 74 comprises bearings 78 (shown) and 80 (hidden) rotatably joined by a hinge pin 82. Other forms of hinged joints are also practical.

As for coupling 70, the first action surfaces 42 of coupling 72 are oriented substantially transversely to the longitudinal axis 48 of the first fastener 34. Due to the transverse orientation of the action surfaces 42, the coupling segments 12 and 14 do not rotate relatively to one another about axis 66 upon their engagement when the fastener 34 is tightened to bring the segments toward one another to couple pipe elements to one another. Like coupling 70, coupling 72 is advantageous when a more flexible pipe joint is desired. When the fastener 34 is tightened, friction between the torqued fastener and its respective lug tends to rotate the coupling segments relatively to one another, thereby causing unwanted engagement between the projections 18*a* and 18*b* and the grooves in the pipe elements. Similar to coupling 70 and shown in FIGS. 7 and 8 (which also illustrate lugs 26 of coupling 72), this unwanted effect is mitigated by engagement between one or both of the stop surfaces 58 on the lugs 26 because the geometry of the support surfaces 44 and the stop surfaces 58, their lengths, positions on the segments and orientation angles are coordinated with the arcuate projections 18*a* and 18*b* such that the projections will not lock up within the circumferential grooves of the pipe elements when the first stop surfaces 58 engage. Engagement of the stop surfaces also prevents unwanted torsion loads on the hinge about an axis transverse to rotation axis 76. Engagement between the stop surfaces and support surfaces may also serve as final visual confirmation that the coupling 72 has been properly installed. The stop surfaces provide this confirmation over the entire tolerance range imposed on the diameter of the circumferential grooves in the pipe elements.

As with couplings 10 and 70, the first lugs 26 of coupling 72 define a first opening 27 surrounding a first axis 29 oriented transversely to the longitudinal axis 48 of the first fastener 34. Axis 48 and fastener 34 are positioned between the first action surfaces 42 and the first support surfaces 44. In the example embodiment shown the first opening 27 extends through said first lugs 26. In a practical embodiment, the first adjustable fastener 34 may comprise a nut 38 and bolt 40.

Figure 10:
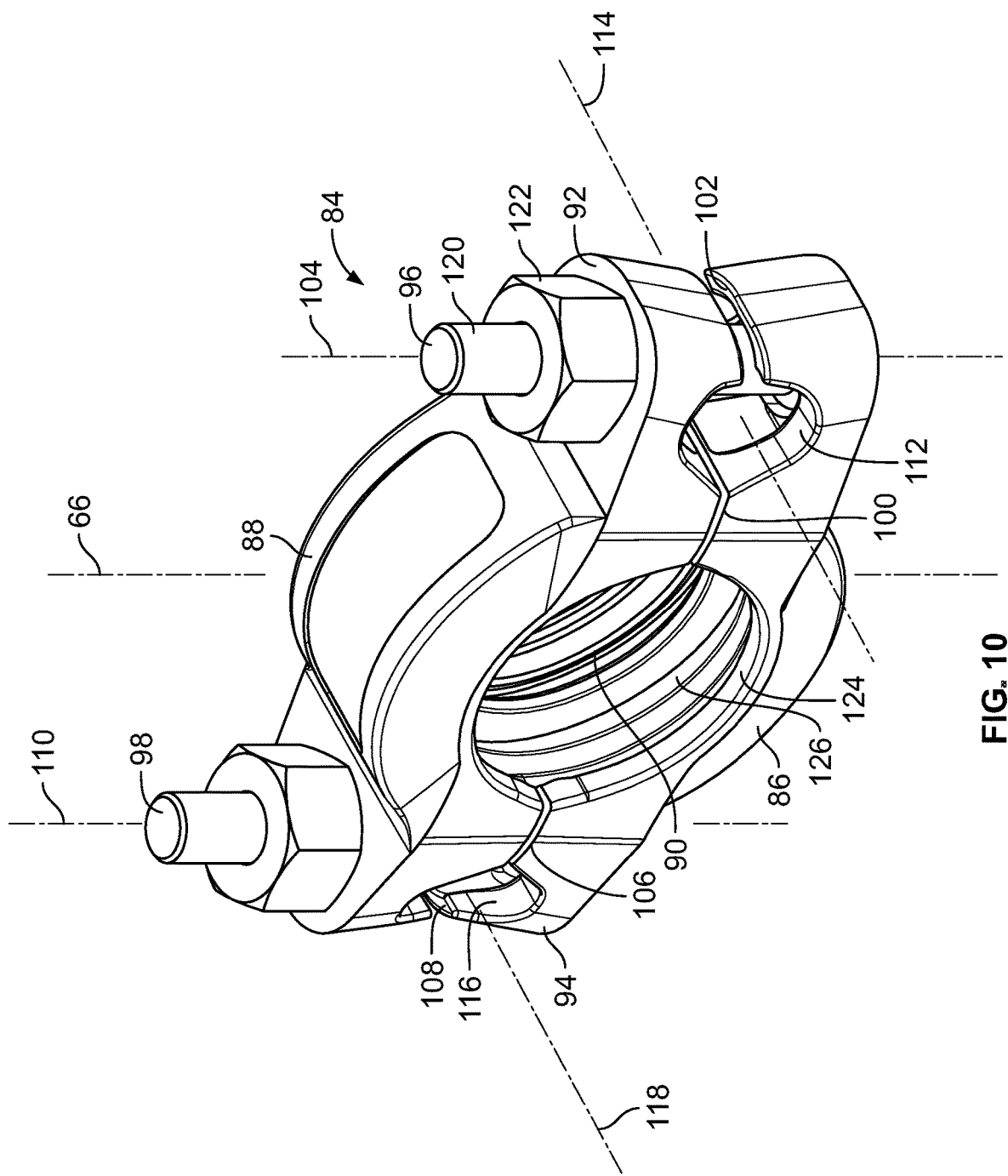
FIG. 10 is an isometric view of another example embodiment of a coupling according to the invention in a factory assembled state.
Figure 10A:
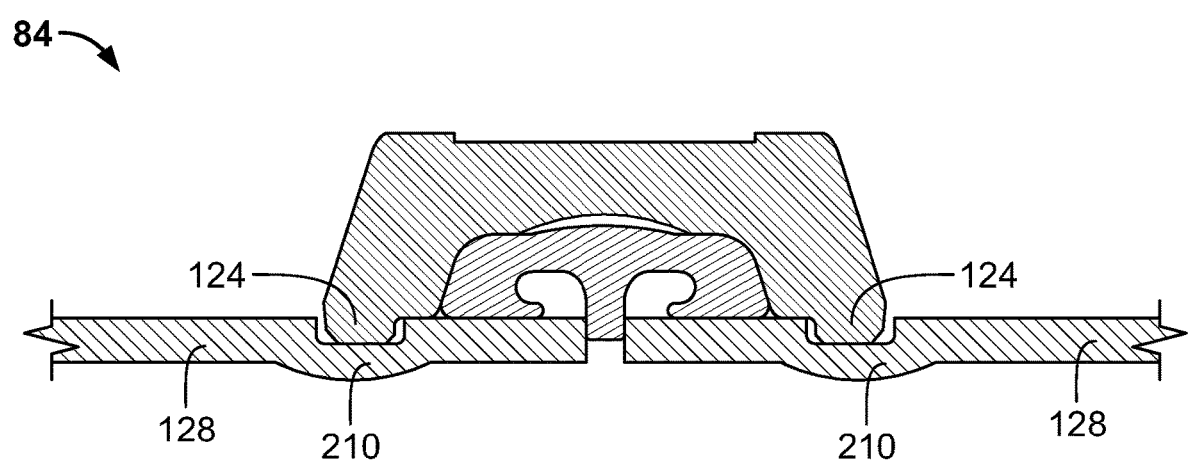
FIG. 10A is a partial section view through an example coupling as shown in FIG. 10 in a fully installed state.
Figure 11:
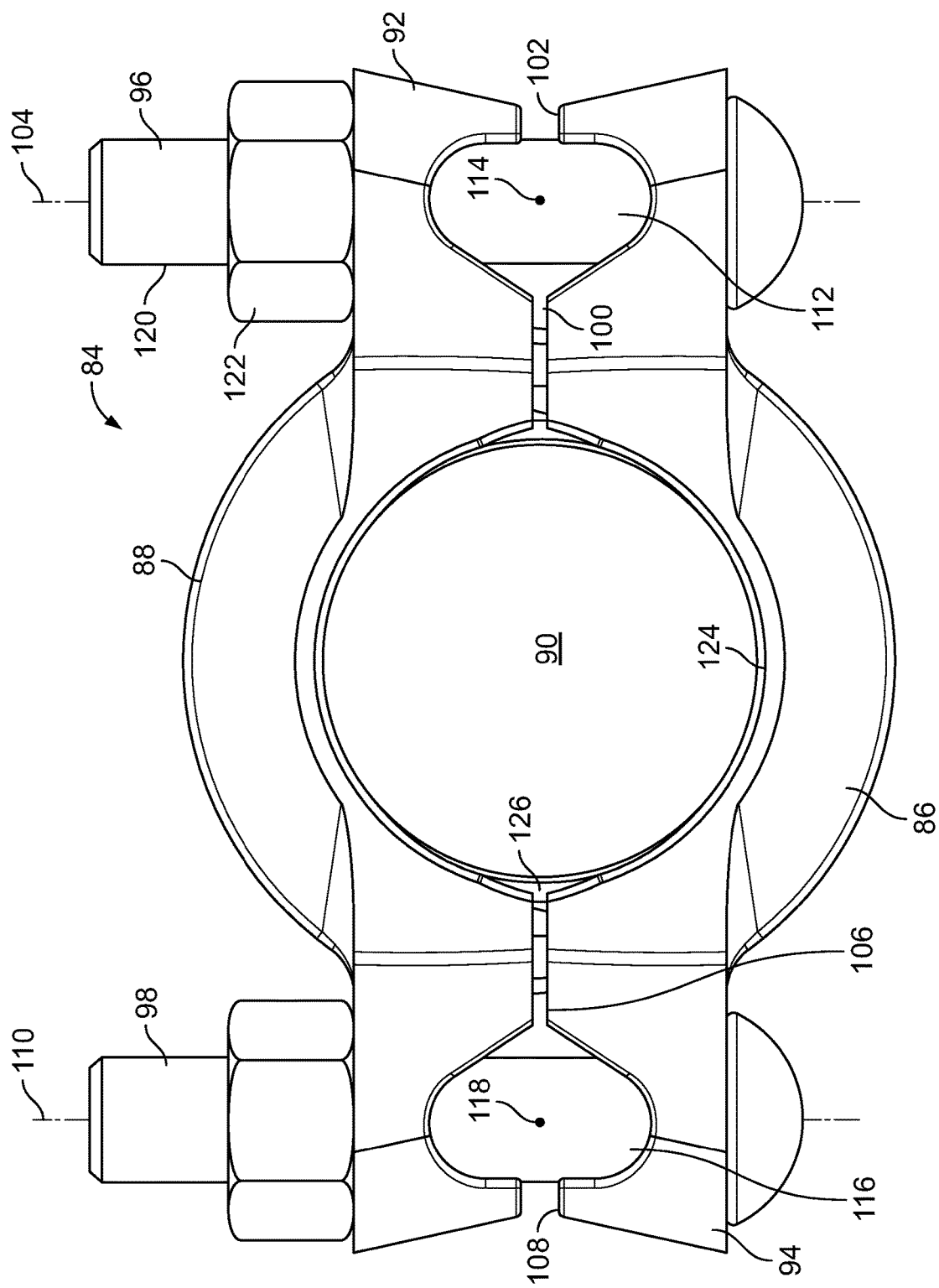
FIG. 11 is a front view of the example coupling shown in FIG. 10.

FIGS. 10, 10A, and 11 show another example embodiment of a coupling 84 for joining pipe elements in end to end relation. Coupling 84 is useful to create a relatively stiff, or rigid joint without inducing rotation of the coupling segments 86, 88 about axis 66, through the application of forceful radial contact by the arcuate projections 124 against pipe elements 128 within circumferential grooves 210 as shown in FIG. 10A. In this example the coupling 84 comprises first and second segments 86 and 88 attached to one another end to end surrounding a central space 90 for receiving the pipe elements. Each segment 86, 88 comprises a first lug 92 extending from a first end thereof and a second lug 94 extending from a second end thereof. The first and second lugs of the first segment 86 align respectively with the first and second lugs of the second segment 88. A first adjustable fastener 96 extends between the first lugs 92 and a second adjustable fastener 98 extends between the second lugs 94.

In this example each segment 86 and 88 further comprises a first action surface 100 positioned between the central space 90 and the first lug 92. Each segment also comprises a first support surface 102 positioned on the first lug 92. The first fastener 96 is positioned between the first action surface 100 and the first support surface 102. The first action surface 100 and the first support surface 102 are oriented transversely to a longitudinal axis 104 of the first fastener 96.

A second action surface 106 is positioned between the central space 90 and the second lug 94. A second support surface 108 is positioned on the second lug 94. The second fastener 98 is positioned between the second action surface 106 and the second support surface 108. The second action surface 106 and the second support surface 108 are oriented transversely to a longitudinal axis 110 of the second fastener 98.

Figure 11A:
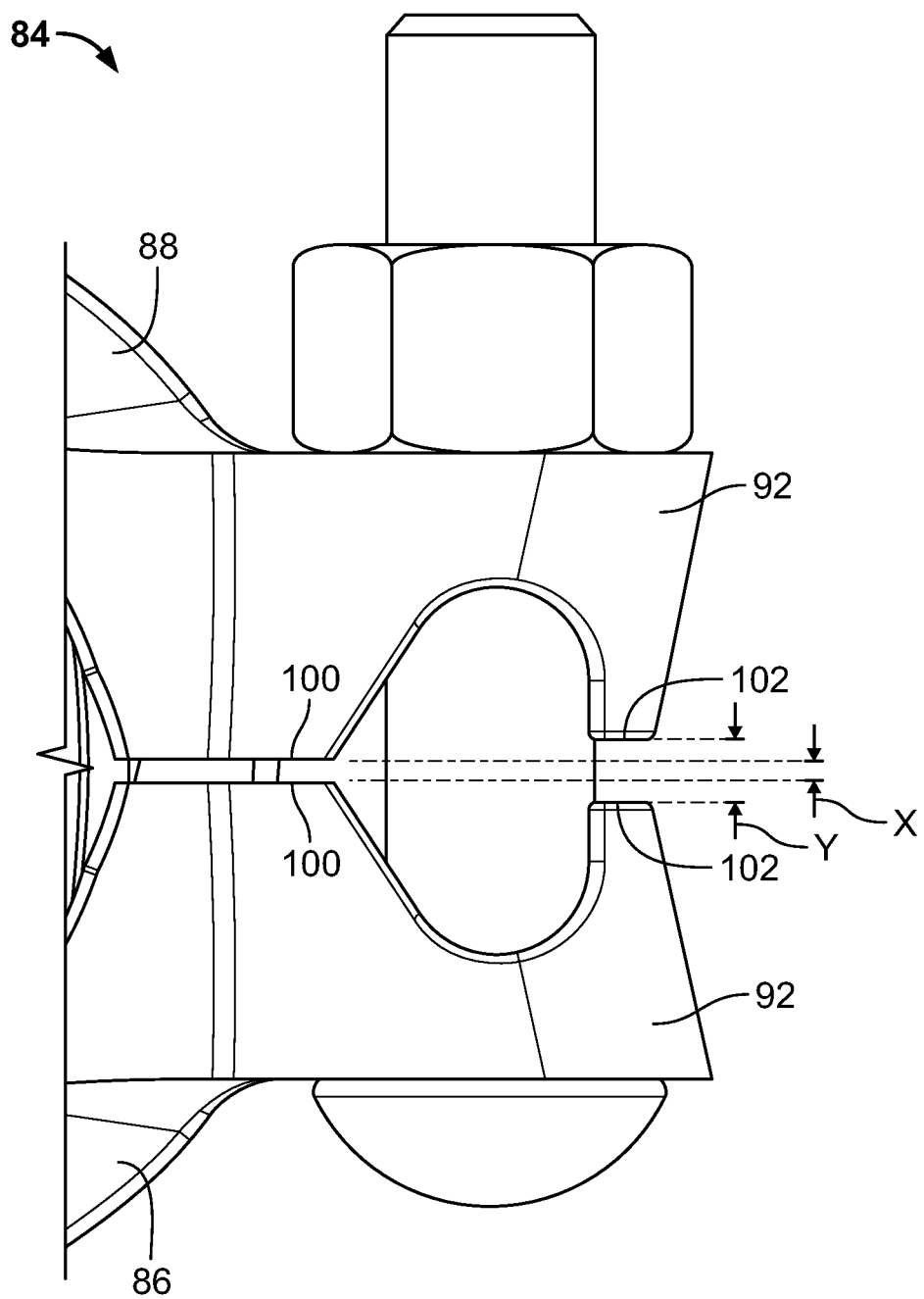
FIGS. 11A-11F are front views of portions of the coupling shown in FIG. 11 on an enlarged scale.
Figure 11B:
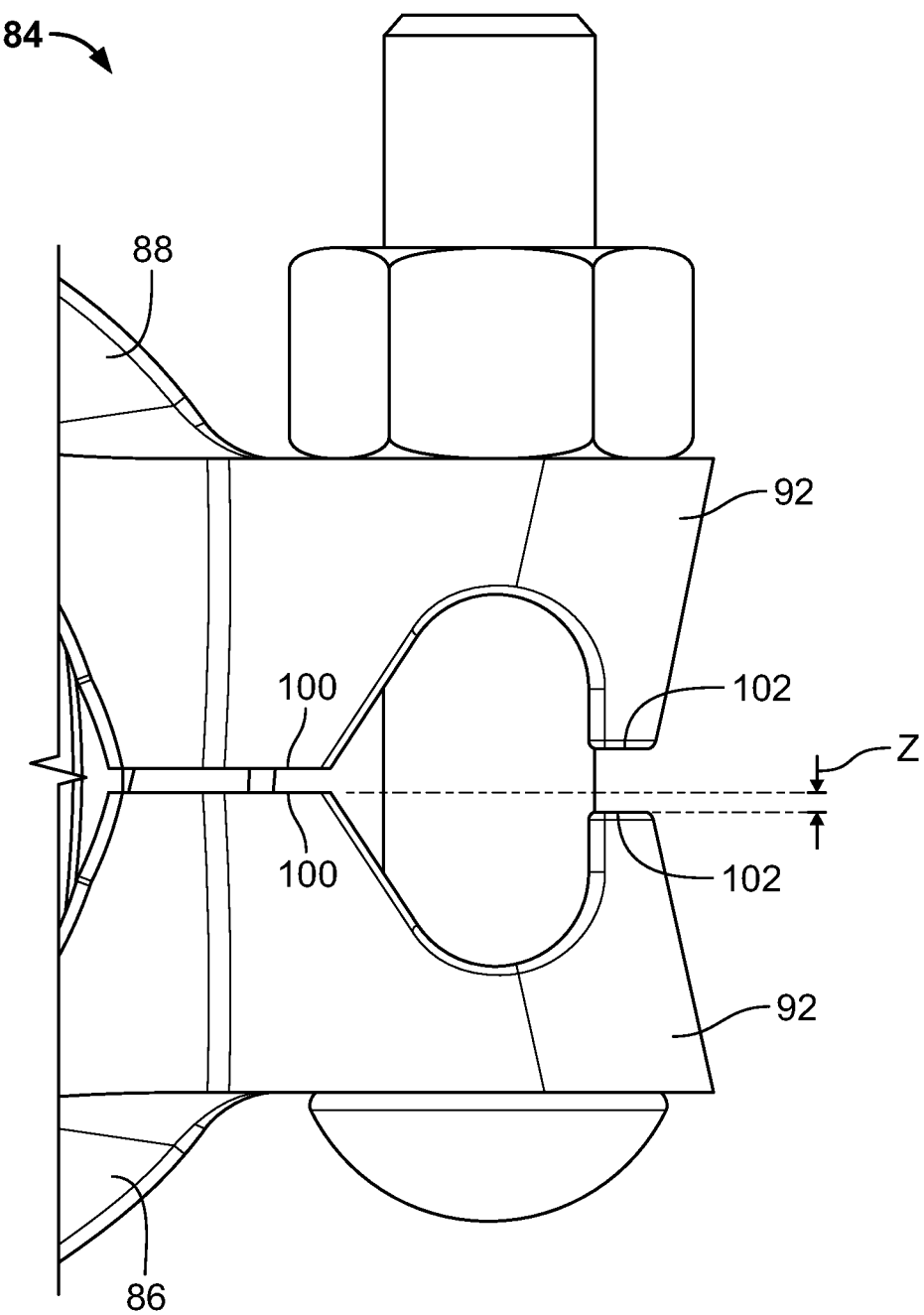
Figure 11C:
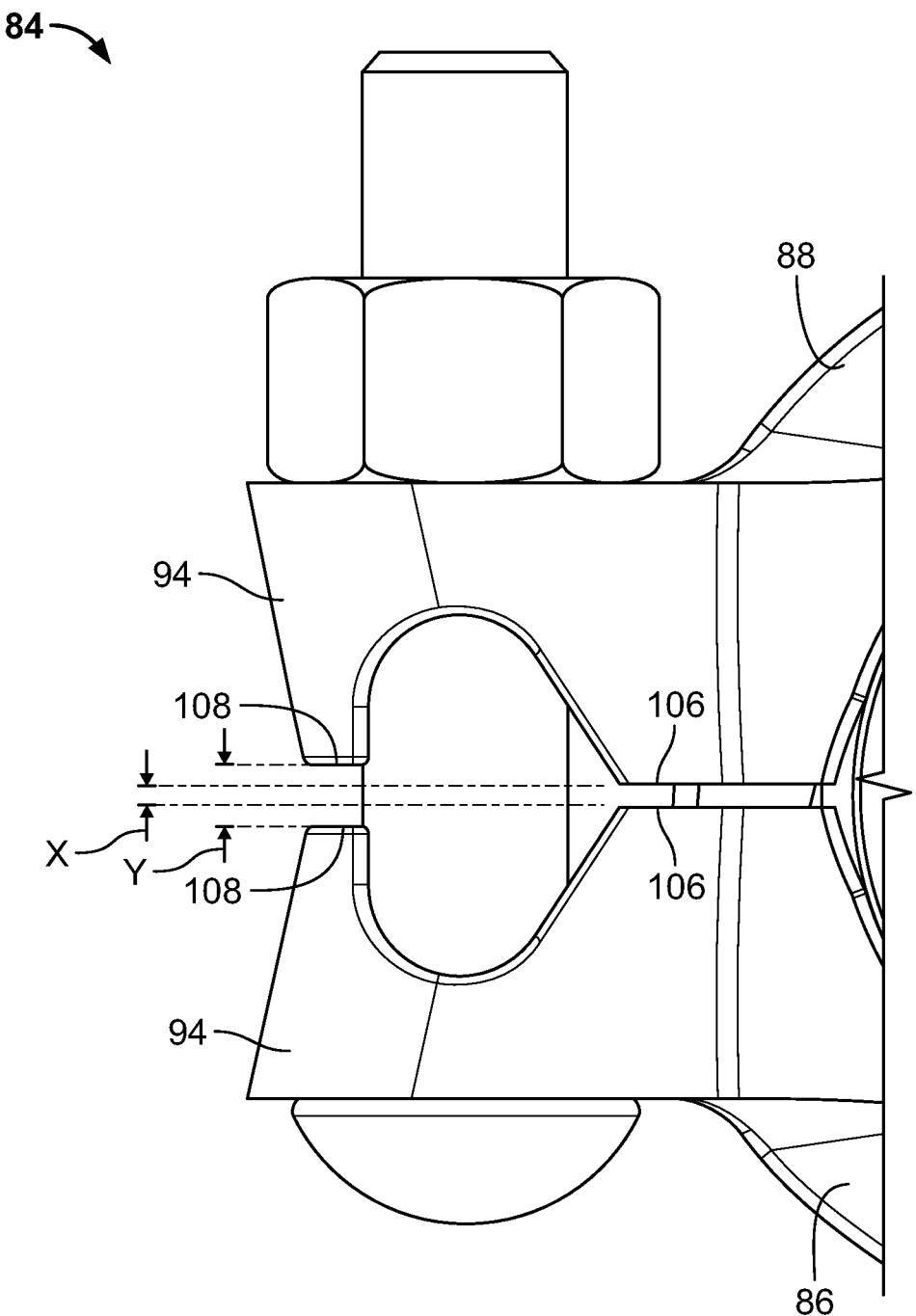
Figure 11D:
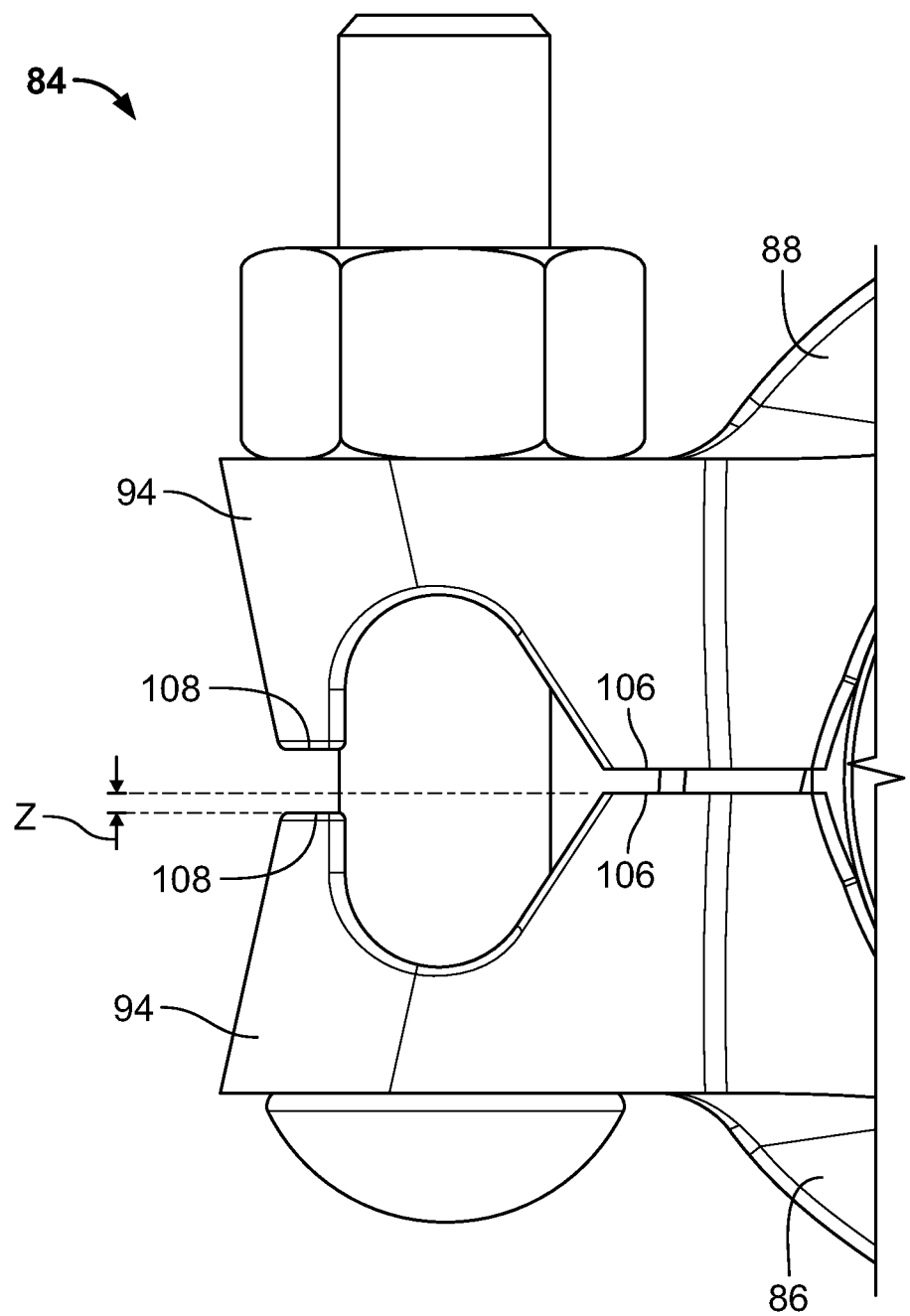
Figure 11E:
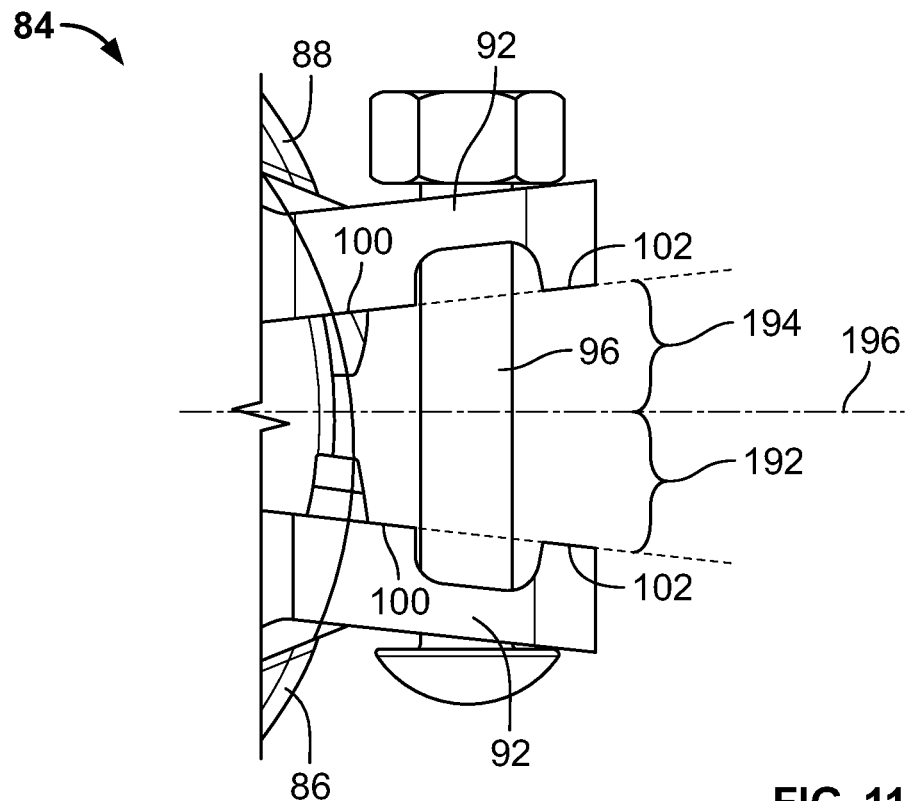
Figure 11F:
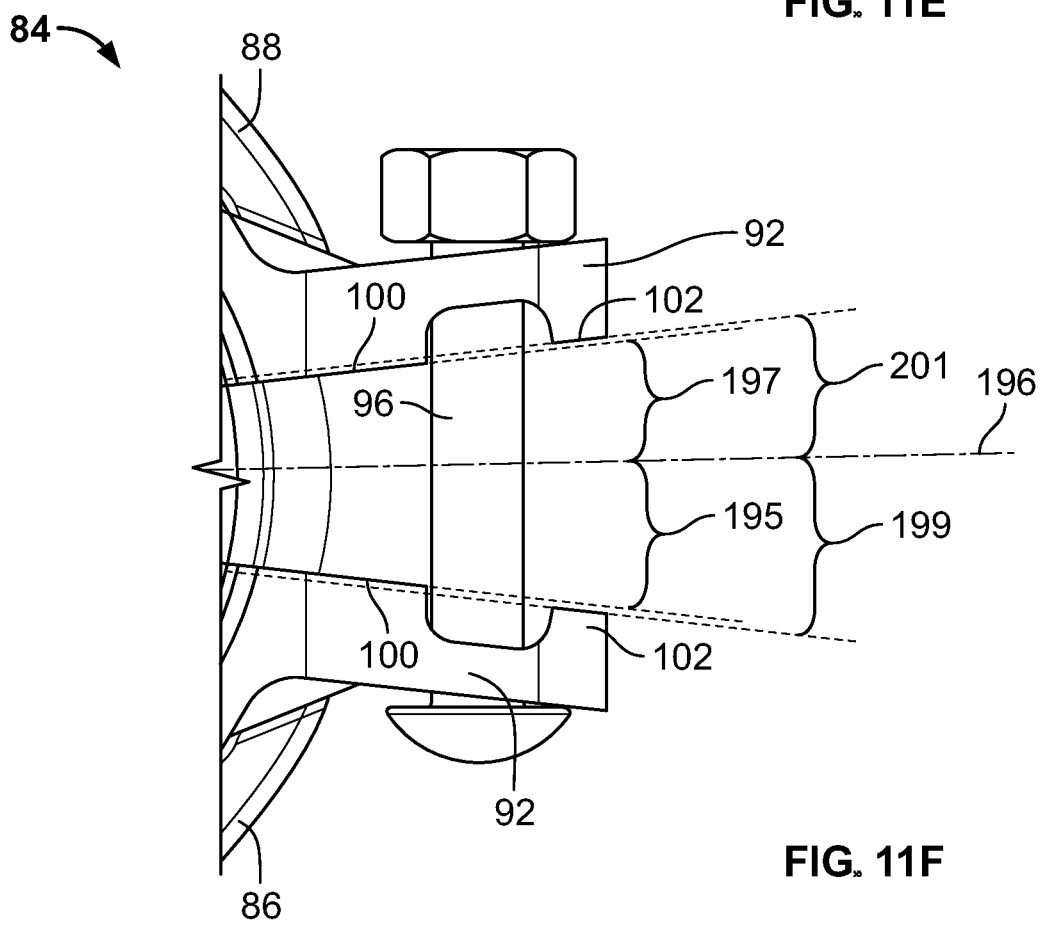

Advantageously, the first lugs 92 may define a first opening 112 surrounding a first axis 114 oriented transversely to the longitudinal axis 104 of the first fastener 96 and positioned between the first action surfaces 100 and the first support surfaces 102. In a practical embodiment, the first opening 112 extends through the first lugs 92. The bending stiffness of the first lugs 92 may be tuned to a desired value by properly sizing the first opening 112. Similarly, the second lugs 94 may define a second opening 116 surrounding a second axis 118 oriented transversely to the longitudinal axis 110 of the second fastener 98 and positioned between the second action surfaces 106 and the second support surfaces 108. In a practical embodiment, the second opening 116 extends through the second lugs 94. The bending stiffness of the second lugs 94 may be tuned to a desired value by properly sizing the second opening 116. Bending of the lugs is effected by the fasteners 96 and 98, which in this example embodiment comprise a bolt 120 and a nut 122. Stiffness tuning of the first and second lugs 92 and 94 is used to determine the operation of coupling 84 as described below. In an example embodiment illustrated in FIGS. 11A and 11B, the tuning of the lugs 92 on segments 86 and 88 may also include controlling the amount of bending of the lugs by adjusting the sizes of the gap X between first action surfaces 100 relative to the gap Y between first support surfaces 102, with it being advantageous for the gap Y between the first support surfaces 102 to be greater than the gap X between first action surfaces 100 (FIG. 11A). The relative gap may be conveniently controlled, for instance, by an offset Z between the first action surfaces 100 and the first support surfaces 102 on one or both segments 86 and 88, as shown in FIG. 11B for segment 86. Offset Z is measured from the first action surface 100. Similarly, as shown in FIGS. 11C and 11D, the tuning of the lugs 94 on segments 86 and 88 may also include controlling the amount of bending of the lugs by adjusting the sizes of the gap X between second action surfaces 106 relative to the gap Y between second support surfaces 108, with it being advantageous for the gap Y between the second support surfaces 108 to be greater than the gap X between second action surfaces 106 (FIG. 11C). The relative gap may be conveniently controlled, for instance, by an offset Z between the second action surfaces 106 and the second support surfaces 108 for one or both segments 86 and 88 as shown in FIG. 11D for segment 86. Offset Z is measured from the second action surface 106. As shown in FIGS. 11E and 11F, other forms of offsets, such as angular offsets, are feasible to control the manner and form of contact between the first support surfaces and second support surfaces in order to accommodate varying pipe tolerances and materials as described herein. As shown in FIG. 11E, both the first action surface 100 and the first support surface 102 on lugs 92 respectively on each segment 86 and 88 have respective orientation angles 192 and 194 measured from a plane 196 extending between the segments 86 and 88. The magnitude of the orientation angles 192 and 194 naturally controls the spacing between first action surfaces 100 and first support surfaces 102 on each segment 86 and 88 when the first lugs 92 are drawn toward one another as the first fastener 96 is tightened. Increasing or decreasing the orientation angles 192 and 194 will concomitantly increase or decrease the separation of the first support surfaces 102 as measured at the point when the first action surfaces 100 come into contact. It is advantageous if the magnitudes of both angles 192 and 194 are substantially equal to one another, although designs wherein the angles 192, 194 are not the same are contemplated as within the scope of the invention. While the first lugs 92 are illustrated in FIG. 11E, it is understood that second lugs 94 (see FIG. 11) may be mirror images of the first lugs and also have angularly oriented second action surfaces and angularly oriented second support surfaces the same as or similar to first lugs 92. FIG. 11F shows another example embodiment of coupling 84 wherein the first action surfaces 100 on first lugs 92 of each segment 86 and 88 have respective first orientation angles 195 and 197 (again measured from plane 196) and first support surfaces 102 on first lugs 92 of each segment 86 and 88 have respective second orientation angles 199 and 201 measured from plane 196. The magnitudes of the orientation angles 195, 197, 199 and 201 naturally control the spacing between first action surfaces 100 and first support surfaces 102 on each segment 86 and 88 when the first lugs 92 are drawn toward one another as the first fastener 96 is tightened. Increasing or decreasing the orientation angles 195, 197, 199 and 201 will concomitantly increase or decrease the separation of the first support surfaces 102 as measured at the point when the first action surfaces 100 come into contact. Furthermore, the use of different orientation angles between the action surfaces 100 and the support surfaces 102 is expected to provide greater variability and thus increase the ability to fine tune the behavior of the segments 86 and 88. Although only first lugs 92 are shown, it is understood that second lugs 94 (see FIG. 11) may be mirror images of the first lugs and also have angularly oriented second action surfaces and angularly oriented second support surfaces the same as or similar to the first lugs 92.

As shown in FIG. 10, each segment 86, 88 of the example coupling 84 according to the invention comprises first and second arcuate projections 124 positioned on opposite sides of the segments. Each of the arcuate projections 124 faces the central space 90, and each of the arcuate projections is engageable within circumferential grooves in the pipe elements (not shown) when the segments are drawn toward one another by the adjustable fasteners 96 and 98 to connect the pipe elements end to end.

Coupling 84 may further comprise a seal 126 positioned within the central space 90. When coupling 84 is provided in a "factory pre-assembled state" (segments 86 and 88 connected end to end surrounding the central space 90) seal 126 may be used to support the segments 86 and 88 in spaced apart relation sufficient to permit insertion of the pipe elements into the central space 90 without disassembling the coupling. Seal 126 engages the pipe elements and the segments to ensure a fluid tight joint.

Figure 12:
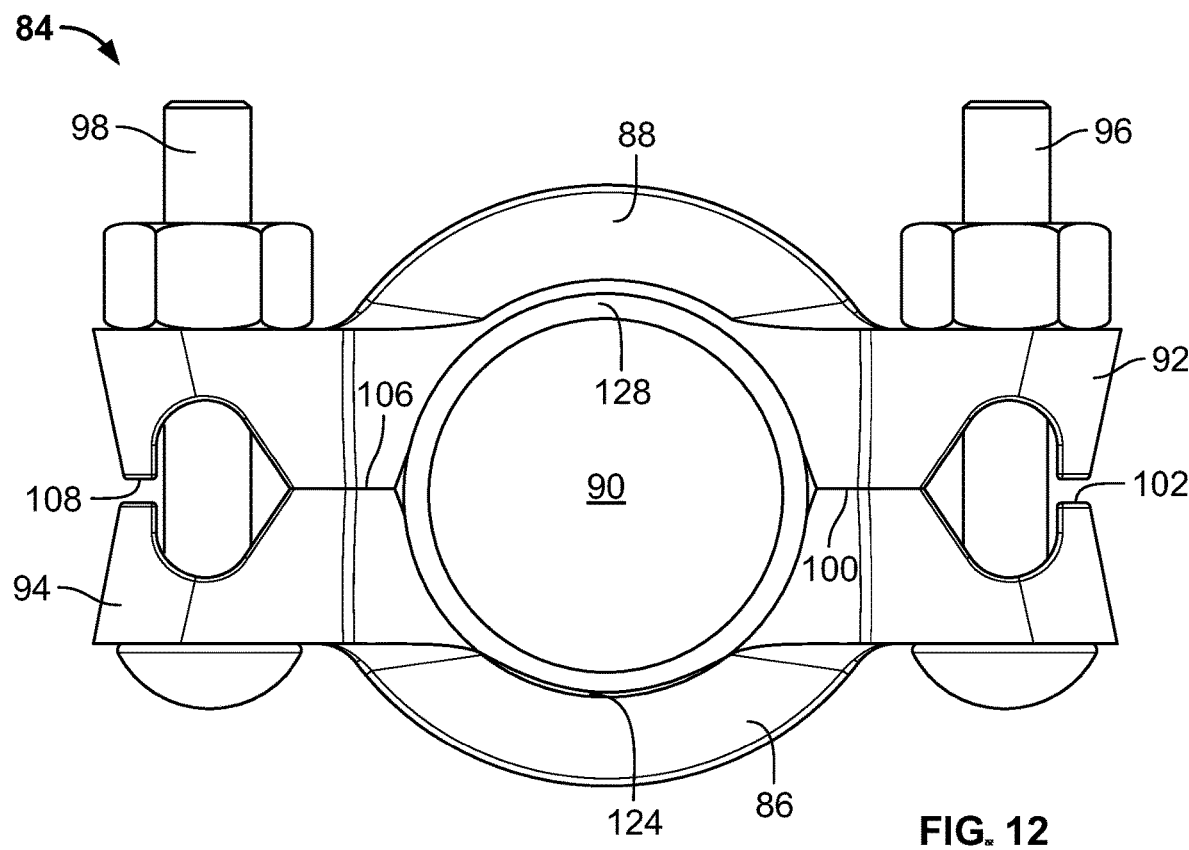
FIGS. 12 and 13 are front views showing the example coupling of FIG. 10 in use on a pipe element having a circumferential groove with a diameter near the lower end of the tolerance range.
Figure 13:
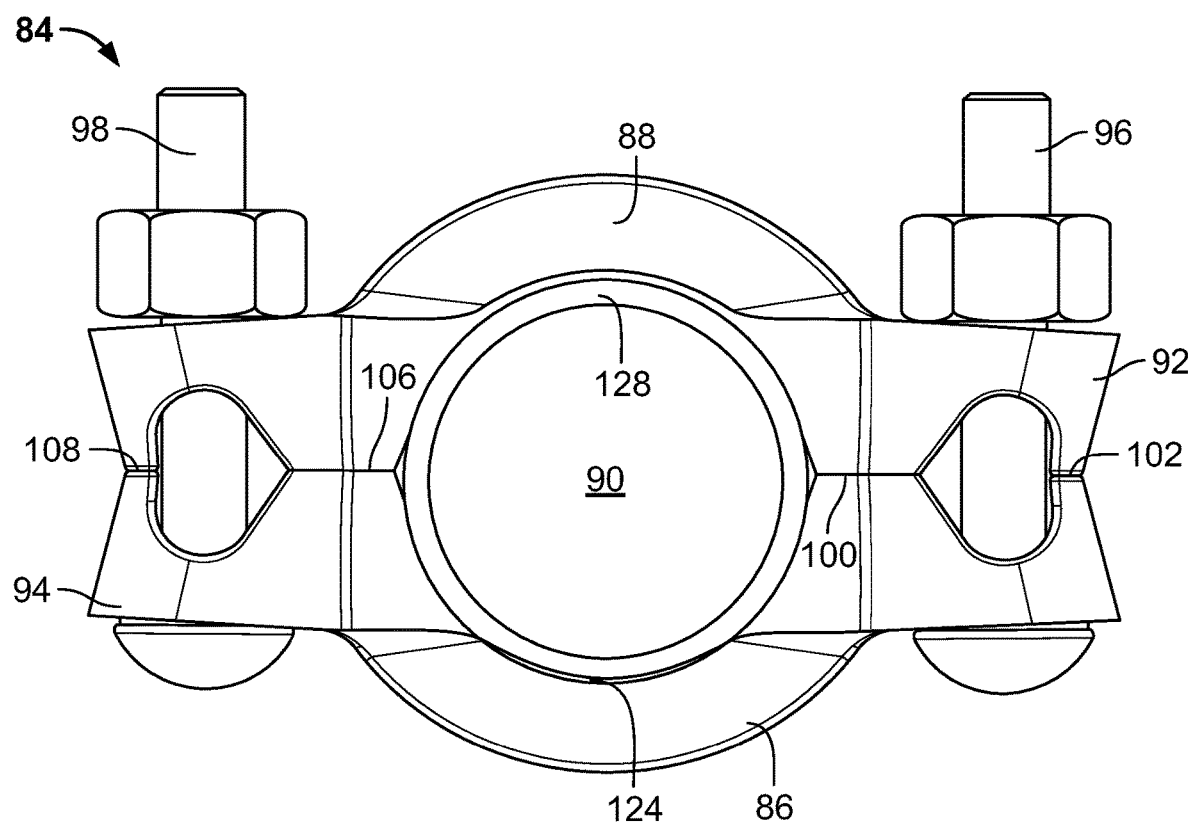

Coupling 84 is designed to produce a relatively rigid joint between the pipe elements over a broad tolerance range of groove diameters while still permitting visual indication that a proper joint has been formed. FIGS. 12 and 13 illustrate coupling 84 engaging a pipe element 128 having a groove diameter at the lower end of the groove diameter tolerance range. Pipe element 128 has been inserted into the central space 90 and the fasteners 96 and 98 have been tightened to first bring the arcuate projections 124 into forceful contact with outer surfaces of the pipe elements within the grooves, such that continued tightening results both the first action surfaces 100 on each segment 86 and 88 being brought into close juxtaposition or into contact and the second action surfaces 106 on each segment being brought into close juxtaposition or into contact, as shown in FIG. 12. The bending stiffness of the lugs 92 and 94 is tuned such that further tightening of fasteners 96 and 98 will bring both the first support surfaces 102 on each segment 86 and 88 into contact and the second support surfaces 108 on each segment into contact. In an embodiment, the amount of tightening required to bring both the first support surfaces 102 into contact may be controlled or affected by the relative gap X between the first action surfaces and the gap Y between the first support surfaces. This first configuration is shown in FIG. 13 and visually signals a completed joint for a pipe element at the lower end of the groove diameter tolerance range by contact between the first support surfaces 102 and the second support surfaces 108.

Figure 14:
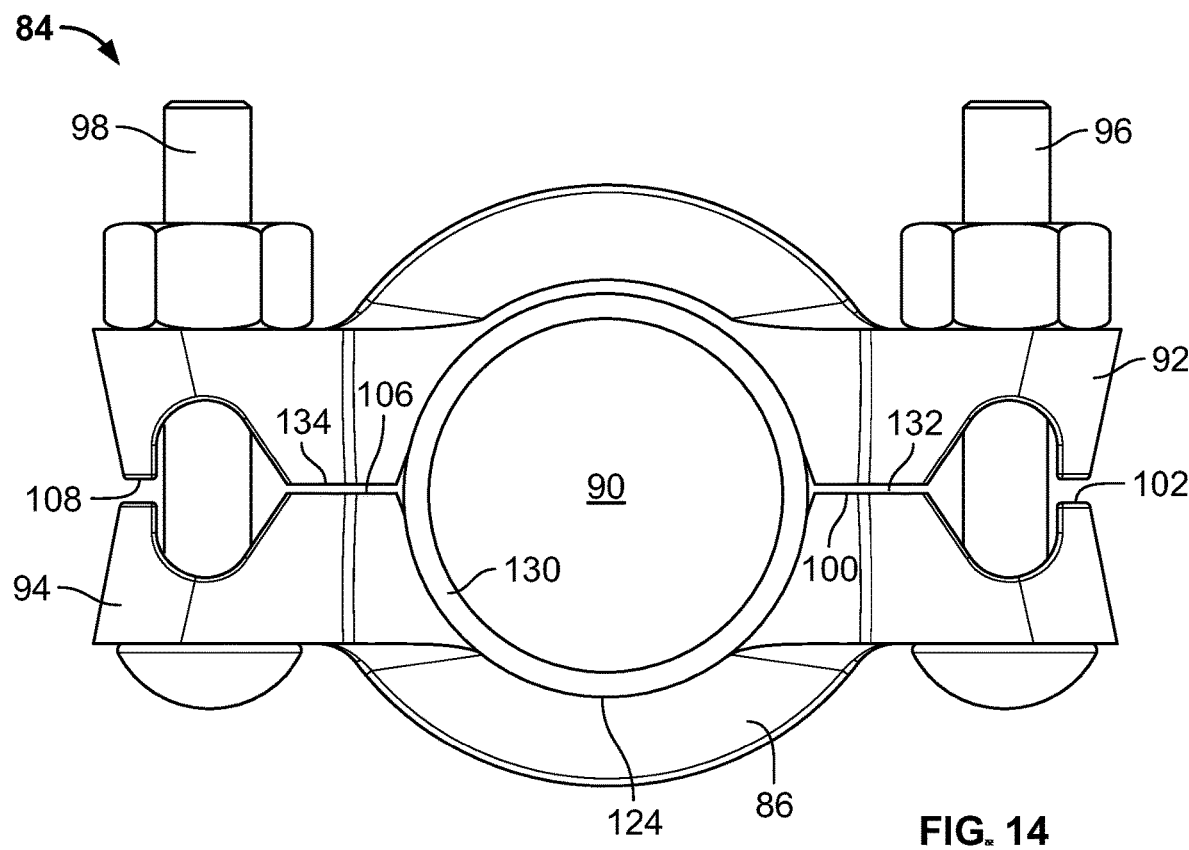
FIGS. 14 and 15 are front views showing the example coupling of FIG. 10 in use on a pipe element having a circumferential groove with a diameter near the higher end of the tolerance range.
Figure 15:
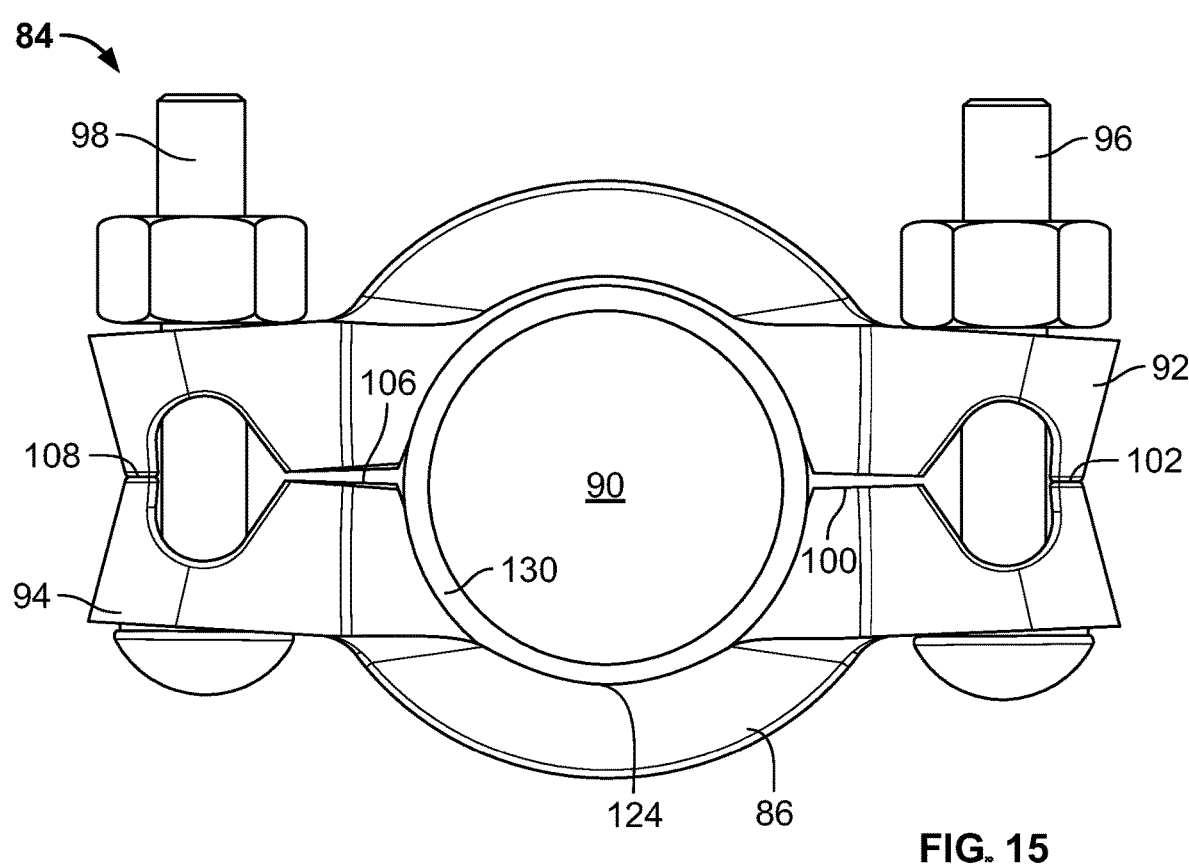

FIGS. 14 and 15 illustrate coupling 84 engaging a pipe element 130 having a groove diameter at the higher end of the groove diameter tolerance range. Pipe element 130 has been inserted into the central space 90 and the fasteners 96 and 98 have been tightened to bring the arcuate projections 124 on each segment 86 and 88 into engagement with the groove of the pipe element 130. Action surfaces 100 on each segment 86 and 88 may not contact one another at the high end of the groove diameter tolerance range; neither may action surfaces 106 come into contact. This is evidenced in FIG. 14 by the gaps 132, 134 which appear respectively between the first action surfaces 100 as well as the second action surfaces 106. The bending stiffness of the lugs 92 and 94 is tuned such that further tightening of fasteners 96 and 98 will bring both the first support surfaces 102 on each segment 86 and 88 into contact and the second support surfaces 108 on each segment into contact. This second configuration is shown in FIG. 15 and signals a completed joint for a pipe element at the higher end of the groove diameter tolerance range. For such pipe elements a completed joint is visually indicated by contact between the support surfaces 102 and 108 on each segment, the gaps 132 and 134 remaining. The tuned behavior of the lugs 92 and 94 reduce the potential for over-torquing fasteners 96 and 98, as the technician can visually confirm that a proper joint has been formed when the support surfaces are in contact.

The configurations described in FIGS. 12-15 are illustrative of certain tolerance conditions, and the range of tolerance conditions encountered in field applications is contemplated within the scope of the invention, including tolerance conditions in between those illustrated, as are variations of the above configurations. As one example, it may be desirable in the small pipe tolerance case described FIGS. 12 and 13 for first action surfaces 100 and second action surfaces 106 to only come into partial or line contact, or even only close juxtaposition in order that the forceful contact between the coupling segments and the pipe elements be relatively maximized, and not prematurely limited by contact between those action surfaces, as maximum forceful contact increases the rigidity of the joint. It is further expected that during the tightening sequence, deformation will occur in the segments 86 and 88, pipe element 128, or both depending on the relative stiffness of the components, the thickness and material of the pipe, as well as the precise tolerance condition of the specific components employed.

Figure 16:
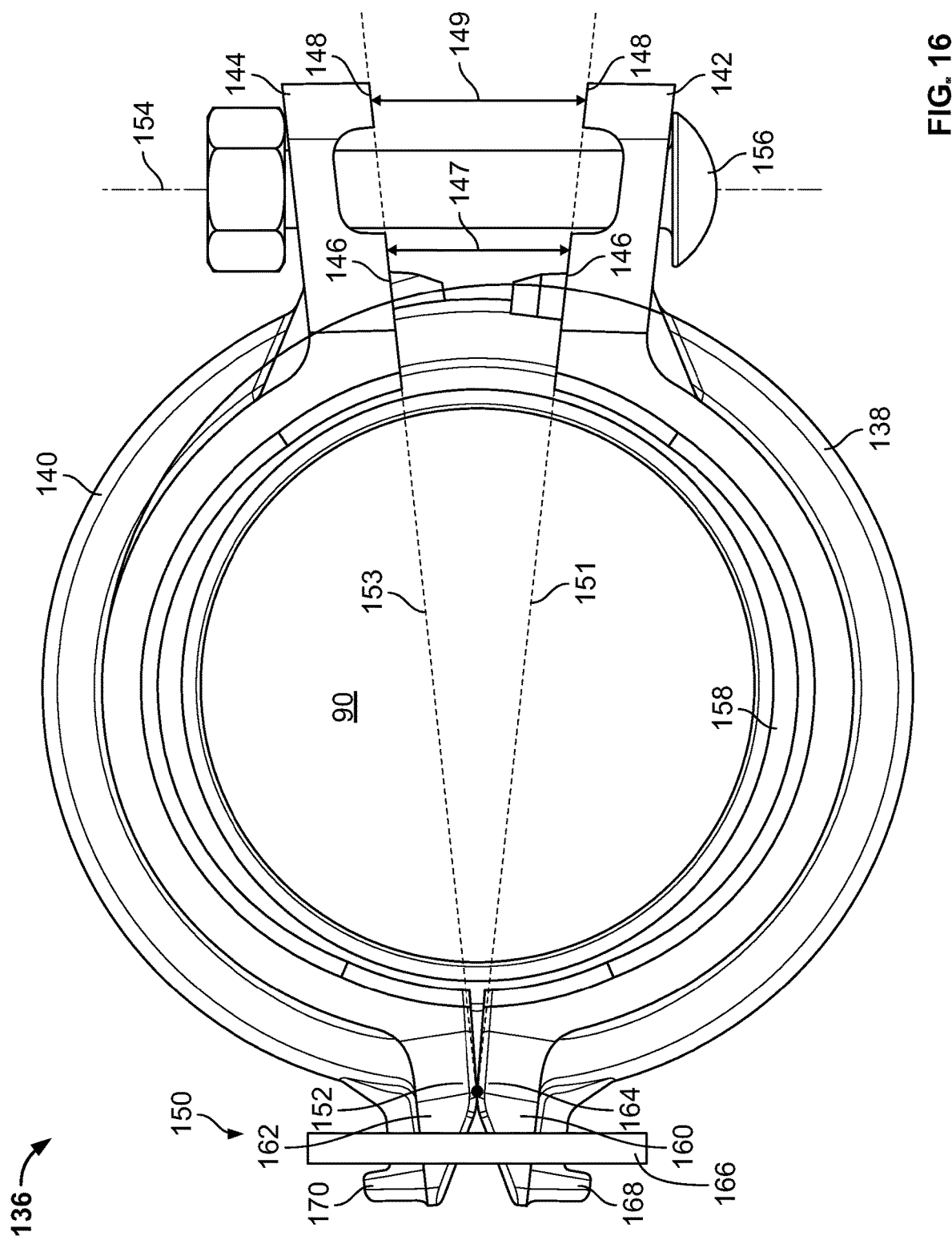
FIGS. 16 and 16A are front views of example hinged pipe couplings according to the invention.

FIG. 16 illustrates another example embodiment of a coupling 136 according to the invention. The first and second segments 138 and 140 of coupling 136 comprise respective first lugs 142 and 144, each having action surfaces 146, support surfaces 148, and tuned bending stiffnesses capable of assuming the first and second configurations (described above) providing a visual indication of a proper joint depending upon the groove diameter of the pipe element. Unlike coupling embodiment 84, coupling 136 substitutes a pivotal arrangement, such as hinge 150, in place of the second lugs. Hinge 150 defines a hinge axis 152 oriented transversely to the longitudinal axis 154 of the fastener 156 (in this example, a bolt and nut) extending between lugs 142 and 144. The first and second segments 138 and 140 are pivotable about the hinge axis 154. Adjusting the fastener 156 pivots and thereby draws the first and second segments 138 and 140 toward one another, and into engagement with the pipe element 158 and into either one of the first or second configurations depending upon the where in the tolerance range the groove diameter of the pipe element falls. In this example embodiment, hinge 150 comprises cantilevers 160, 162 engaging one another at a fulcrum 164. Cantilevers 160, 162 are joined by a ring 166, retained by projecting heads 168, 170 on each cantilever. Other forms of hinged joints, such as saddle and stirrup hinges, pinned hinges, cast hinges, and the like, are also practical.

Figure 16A:
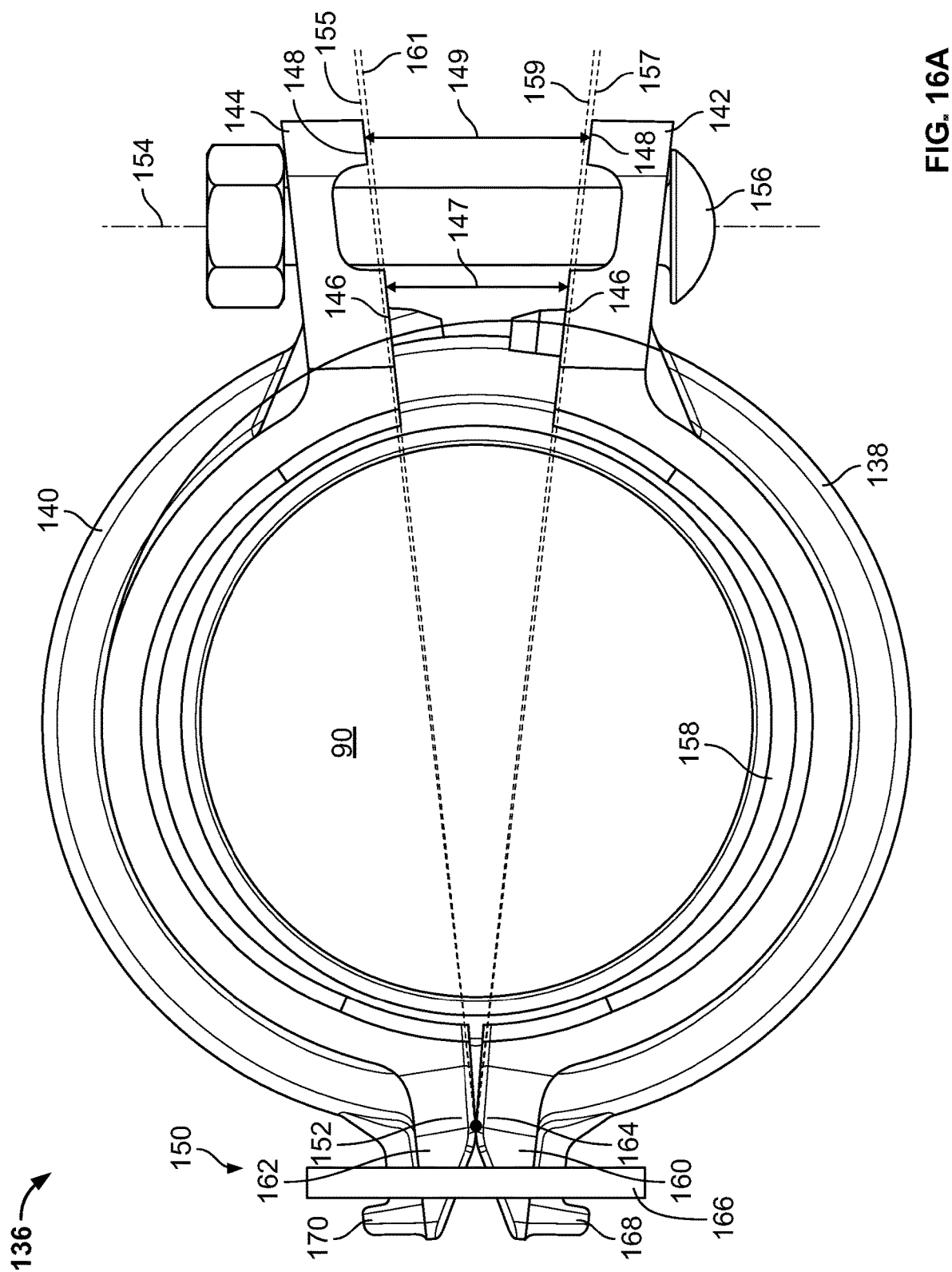
Figure 16B:
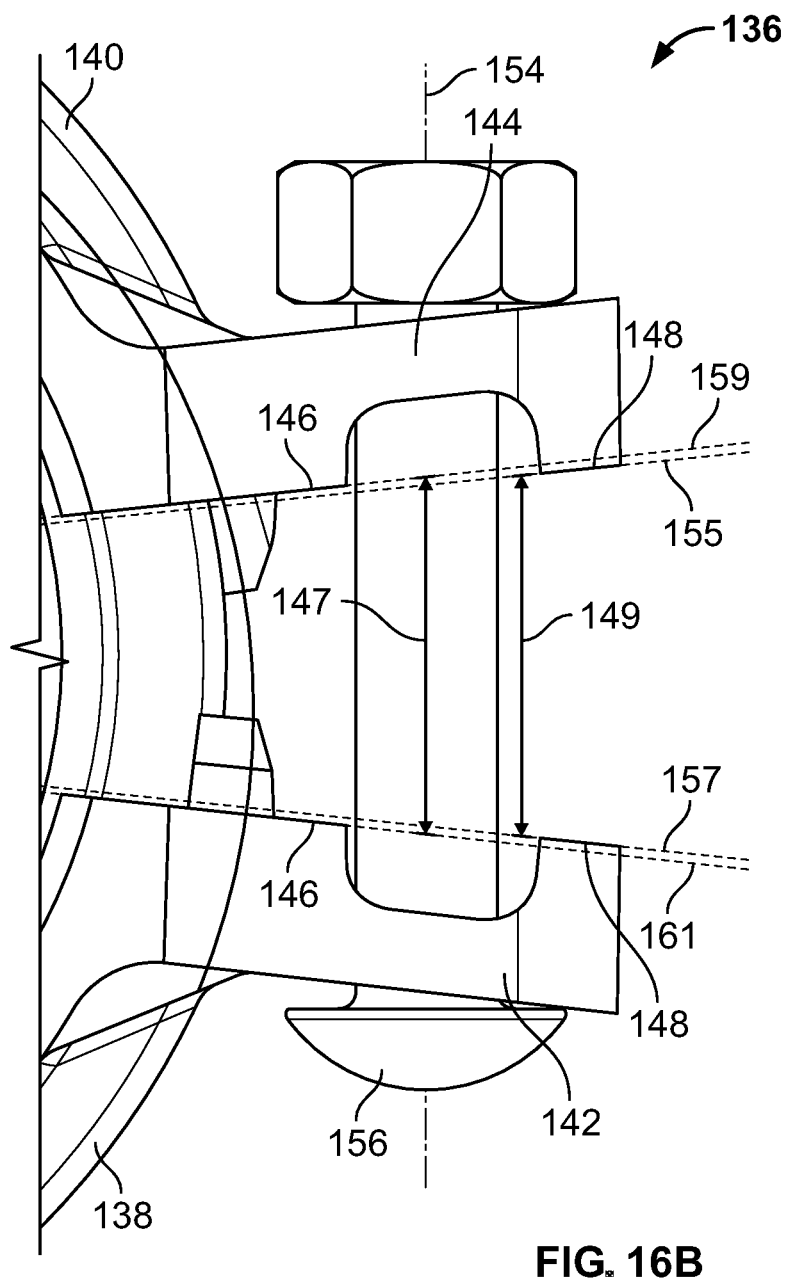
FIG. 16B is a front view of portions of the coupling shown in FIG. 16A.

Example coupling 136 employs a pivotal arrangement with a fulcrum 164 in place of the second lugs, wherein the tuning of the lugs 142 and 144 on segments 138 and 140 may also include controlling the amount of bending of the lugs by adjusting the sizes of the gap 147 between action surfaces 146 relative to the gap 149 between support surfaces 148. Such tuning may be accomplished by forming action surfaces 146 and support surfaces 148 to be substantially parallel to respective rays 151, 153 extending from fulcrum 164, it being understood that such an arrangement creates an effective offset between action support surfaces 148 and action surfaces 146. In another example embodiment of coupling 136 shown in FIG. 16A, it may be advantageous for the gap 149 between the support surfaces 148 to be greater than the gap 147 between action surfaces 146 by forming the support surfaces 148 parallel to rays 155 and 157 respectively, and the action surfaces 146 parallel to rays 159 and 161, where rays 155, 157 subtend a larger angle between them than do rays 159, 161. FIG. 16B shows another example embodiment wherein rays 155 and 157 subtend a smaller arc than rays 159 and 161 resulting the gap 149 being less than the gap 147. This arrangement is expected to be useful for creating flexible couplings where the keys have limited contact with the pipe in order to permit the pipes to move angularly and axially to an extent relative to the coupling. When used with the negative offset as shown in FIG. 16B, the support surfaces 148 will contact before the action surfaces 146, visually indicating that assembly is complete before the coupling is forcefully gripping the pipe enough to inhibit the desired flexibility. Other forms of offsets, such as planar offsets, are feasible to control the manner and form of contact between the first support surfaces and to accommodate varying pipe tolerances and materials as described herein.

Each segment of coupling 136 also comprises first and second arcuate projections 172, 174 positioned on opposite sides of the segments. The arcuate projections face the central space 90 and are engageable within circumferential grooves in the pipe elements when the segments are drawn toward one another by the adjustable fastener 156. A seal 176 may be positioned within the central space 90. The seal may be used to support the segments 138, 140 in spaced apart relation sufficient to permit insertion of the pipe elements into the central space 90 without disassembling the coupling 136.

Figure 17:
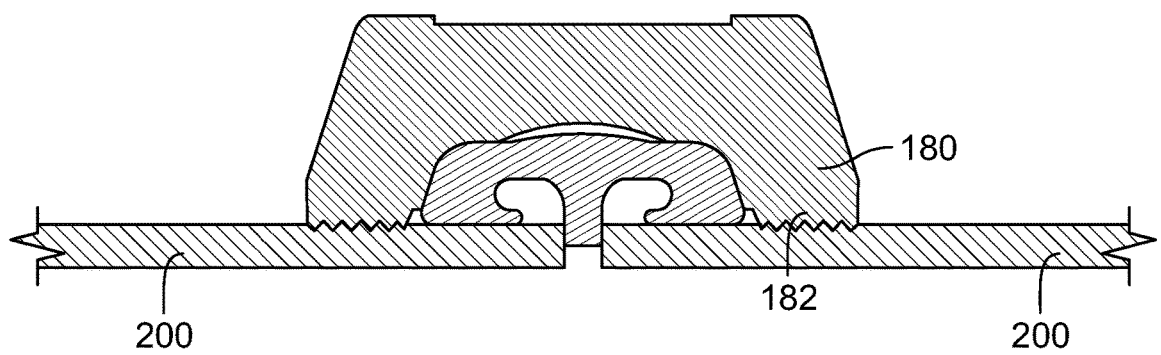
FIGS. 17 and 18 are partial section views of example couplings according to the invention as employed with plain end pipe elements.
Figure 18:
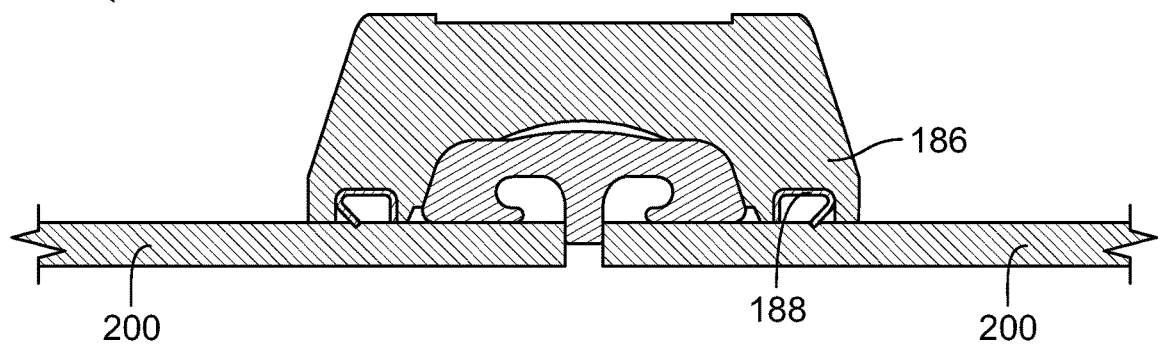

Couplings according to the invention are also contemplated as being used with a variety of formed pipe ends, such as grooved pipe elements (FIG. 10A), shouldered pipe elements, and other forms of pipe ends known in the art, including those which are designed to be retained within the coupling. As shown in FIGS. 17 and 18, the use of plain end pipe elements 200 is also contemplated, in which case the arcuate projections 180 may be provided with teeth 182 as shown on example coupling 184 (FIG. 17), or, arcuate projections 186 may be provided with retaining rings 188, as shown on example coupling 190. Couplings according to the invention having tuned bending of the lugs permits the relative rigidity/flexibility of the joint to be selected by the coupling designer by controlling when in the tightening sequence that contact between the support surfaces occurs, as tightening of the fasteners prior to such contact tends to further enwrap the pipe element with the coupling segments, including increasing the engagement of the arcuate projections with the pipe elements, while continued tightening after such contact occurs tends to compress the lugs rather than act to further engage the arcuate projections with the pipe elements.

It is expected that couplings according to the invention will permit both rigid and flexible joints to be formed easily and reliably while reducing the coupling's sensitivity to poor installation techniques.

All of the embodiments of the claimed invention described herein are provided expressly by way of example only. Innumerable variations and modifications may be made to the example embodiments described herein without departing from the concept of this disclosure. In particular, surfaces or axes described as having a perpendicular or parallel relationship may vary from those conditions while still being within the scope of the invention. Additionally, the scope of this disclosure is intended to encompass any and all modifications and combinations of all elements, features, and aspects described in the specification and claims, and shown in the drawings. Any and all such modifications and combinations are intended to be within the scope of this disclosure.

What is claimed is:

1. A coupling for joining pipe elements in end to end relation, said coupling comprising:
   first and second segments attached to one another end to end surrounding a central space for receiving said pipe elements, each said segment comprising a first lug extending from a first end thereof and a second lug extending from a second end thereof, said first and second lugs of said first segment aligning respectively with said first and second lugs of said second segment;
   a first adjustable fastener extending between said first lugs and a second adjustable fastener extending between said second lugs; wherein
   each said segment further comprises:
   a first action surface positioned between said central space and said first lug, and a first support surface positioned on said first lug, said first fastener being positioned between said first action surface and said first support surface, said first action surface and said first support surface being oriented transversely to a longitudinal axis of said first fastener;
   a second action surface positioned between said central space and said second lug, and a second support surface positioned on said second lug, said second fastener being positioned between said second action surface and said second support surface, said second action surface and said second support surface being oriented transversely to a longitudinal axis of said second fastener; wherein
   said first support surface of at least one of said segments is offset from said first action surface of said at least one segment in a direction parallel to said longitudinal axis of said first adjustable fastener, said offset being measured from said first action surface; and
   upon adjusting said first and second adjustable fasteners to draw said first and second segments toward one another, said first support surface of said first segment contacts said first support surface of said second segment and said second support surface of said first segment contacts said second support surface of said second segment.

2. The coupling according to claim 1, wherein said second support surface of said at least one segment is offset from said second action surface of said at least one segment in a direction parallel to said longitudinal axis of said first adjustable fastener, said offset of said second support surface being measured from said second action surface.

3. The coupling according to claim 1, wherein said first support surface of at least one of said segments is oriented at a first orientation angle measured with respect to a plane extending between said first and second segments.

4. The coupling according to claim 3, wherein said first action surface of said at least one segment is oriented at a second orientation angle measured with respect to said plane.

5. The coupling according to claim 4, wherein said first orientation angle is equal to said second orientation angle.

6. The coupling according to claim 1, wherein:
said first action surface and said first support surface of said first segment are oriented at a first orientation angle measured with respect to a plane extending between said first and second segments;
said first action surface and said first support surface of said second segment are oriented at a second orientation angle measured with respect to said plane;
said second action surface and said second support surface of said first segment are oriented at a third orientation angle measured with respect to said plane;
said second action surface and said second support surface of said second segment are oriented at a fourth orientation angle measured with respect to said plane.

7. The coupling according to claim 1 wherein said first lugs are adapted, upon tightening of said first adjustable fastener, to assume either a first configuration, wherein said first action surfaces are in contact with one another, or a second configuration, wherein a gap is present between said first action surfaces.

8. The coupling according to claim 7 wherein said second lugs are adapted, upon tightening of said second adjustable fastener, to assume either a first configuration, wherein said second action surfaces are in contact with one another, or a second configuration, wherein a gap is present between said second action surfaces.

9. The coupling according to claim 1, wherein said first lugs define a first opening surrounding a first axis oriented transversely to said longitudinal axis of said first fastener and positioned between said first action surfaces and said first support surfaces.

10. The coupling according to claim 9, wherein said first opening extends through said first lugs.

11. The coupling according to claim 9, wherein said second lugs define a second opening surrounding a second axis oriented transversely to said longitudinal axis of said second fastener and positioned between said second action surfaces and said second support surfaces.

12. The coupling according to claim 11, wherein said second opening extends through said second lugs.

13. The coupling according to claim 1, wherein each one of said first and second adjustable fasteners comprises a nut and bolt.

14. The coupling according to claim 1, wherein each of said segments comprises first and second arcuate projections positioned on opposite sides of said segments, each of said arcuate projections facing said central space, each of said arcuate projections being engageable within circumferential grooves in said pipe elements when said segments are drawn toward one another by said adjustable fasteners.

15. The coupling according to claim 1, further comprising a seal positioned within said central space, said seal supporting said segments in spaced apart relation sufficient to permit insertion of said pipe elements into said central space without disassembling said coupling.

16. A coupling for joining pipe elements in end to end relation, said coupling comprising:
first and second segments attached to one another end to end surrounding a central space for receiving said pipe elements, each said segment comprising a first lug extending from a first end thereof, said first lug of said first segment aligning with said first lug of said second segment;
an adjustable fastener extending between said first lugs;
each said segment further comprising a second end, said second ends of said segments arranged opposite to said first ends respectively, each said second end connected to a hinge joining said first and second segments to one another, said hinge defining a hinge axis oriented transversely to a longitudinal axis of said first fastener, said first and second segments being pivotable about said hinge axis; wherein
each said segment further comprises:
an action surface positioned between said central space and said first lug, and a support surface positioned on said first lug, said first fastener being positioned between said action surface and said support surface, said action surface and said support surface being oriented transversely to said longitudinal axis of said fastener; wherein
said support surface of at least one of said segments is offset from said action surface of said at least one segment in a direction parallel to said longitudinal axis of said fastener, said offset being measured from said action surface; and
upon adjusting said adjustable fastener to draw said first and second segments toward one another, said support surface of said first segment contacts said support surface of said second segment, and said first lugs of said segments define a first opening surrounding a first axis oriented transversely to said longitudinal axis of said first adjustable fastener and positioned between said action surfaces and said support surfaces, wherein
each said segment further comprises first and second arcuate projections positioned on opposite sides of said segments, each of said arcuate projections facing said central space, each of said arcuate projections being engageable within circumferential grooves in said pipe elements when said segments are drawn toward one another by said adjustable fastener.

17. The coupling according to claim 16, wherein said action surface and said support surface on said first segment are oriented parallel to a first ray extending from a fulcrum of said hinge, and said action surface and said support surface on said second segment are oriented parallel to a second ray extending from said fulcrum of said hinge.

18. The coupling according to claim 16, wherein:
said action surface on said first segment is oriented parallel to a first ray extending from a fulcrum of said hinge;
said support surface on said first segment is oriented parallel to a second ray extending from said fulcrum of said hinge;
said action surface on said second segment is oriented parallel to a third ray extending from said fulcrum of said hinge;
said support surface on said second segment is oriented parallel to a fourth ray extending from said fulcrum of said hinge.

19. The coupling according to claim 18, wherein said second and said fourth rays subtend a first angle larger than a second angle subtended by said first and third rays.

20. The coupling according to claim 18, wherein said second and said fourth rays subtend a first angle smaller than a second angle subtended by said first and third rays.

21. The coupling according to claim 16, wherein said first lugs are adapted, upon tightening of said adjustable fastener, to assume either a first configuration, wherein said action surfaces are in contact with one another, or a second configuration, wherein a gap is present between said action surfaces.

22. The coupling according to claim 16, wherein said first opening extends through said first lugs.

23. The coupling according to claim 16, wherein said adjustable fastener comprises a nut and bolt.

24. The coupling according to claim 16, further comprising a seal positioned within said central space, said seal supporting said segments in spaced apart relation sufficient to permit insertion of said pipe elements into said central space without disassembling said coupling.

25. A coupling for joining pipe elements in end to end relation, said coupling comprising:
- first and second segments attached to one another end to end surrounding a central space for receiving said pipe elements, each said segment comprising a first lug extending from a first end thereof, said first lug of said first segment aligning with said first lug of said second segment;
- an adjustable fastener extending between said first lugs; and
- a seal positioned within said central space, said seal supporting said segments in spaced apart relation sufficient to permit insertion of said pipe elements into said central space without disassembling said coupling;
- each said segment further comprising a second end, said second ends of said segments arranged opposite to said first ends respectively, each said second end connected to a hinge joining said first and second segments to one another, said hinge defining a hinge axis oriented transversely to a longitudinal axis of said first fastener, said first and second segments being pivotable about said hinge axis; wherein each said segment further comprises:
- an action surface positioned between said central space and said first lug, and a support surface positioned on said first lug, said first fastener being positioned between said action surface and said support surface, said action surface and said support surface being oriented transversely to said longitudinal axis of said fastener; wherein said support surface of at least one of said segments is offset from said action surface of said at least one segment in a direction parallel to said longitudinal axis of said fastener, said offset being measured from said action surface; and upon adjusting said adjustable fastener to draw said first and second segments toward one another, said support surface of said first segment contacts said support surface of said second segment, and said first lugs of said segments define a first opening surrounding a first axis oriented transversely to said longitudinal axis of said first adjustable fastener and positioned between said action surfaces and said support surfaces.

* * * * *